(12) United States Patent
Shishido et al.

(10) Patent No.: US 8,311,117 B2
(45) Date of Patent: Nov. 13, 2012

(54) MOTION VECTOR DETECTING APPARATUS AND MOTION VECTOR DETECTING METHOD

(75) Inventors: Tomoyuki Shishido, Kanagawa (JP); Maki Koizumi, Kanagawa (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 427 days.

(21) Appl. No.: 12/763,725

(22) Filed: Apr. 20, 2010

(65) Prior Publication Data
US 2010/0265406 A1   Oct. 21, 2010

(30) Foreign Application Priority Data
Apr. 21, 2009   (JP) ................ P2009-102752

(51) Int. Cl.
  *H04N 7/12*      (2006.01)
  *H04N 11/02*    (2006.01)
  *H04N 11/04*    (2006.01)
  *H04B 1/66*      (2006.01)

(52) U.S. Cl. ......... 375/240.16; 375/240.01; 375/240.12; 382/232; 382/236; 382/237

(58) Field of Classification Search ............ 375/240, 375/240.01–240.29; 382/232, 236, 237; 348/402.1, 415.1, 416.1, 699, 700
See application file for complete search history.

(56) References Cited

U.S. PATENT DOCUMENTS

| | | | | |
|---|---|---|---|---|
| 4,992,869 A | * | 2/1991 | Samad et al. | 348/451 |
| 4,998,168 A | * | 3/1991 | Gillard | 348/451 |
| 5,005,077 A | * | 4/1991 | Samad et al. | 348/452 |
| 5,005,078 A | * | 4/1991 | Gillard | 348/452 |
| 5,012,336 A | * | 4/1991 | Gillard | 348/452 |
| 5,012,337 A | * | 4/1991 | Gillard | 348/452 |
| 5,016,101 A | * | 5/1991 | Richards et al. | 348/452 |
| 5,016,102 A | * | 5/1991 | Avis | 348/452 |
| 5,021,881 A | * | 6/1991 | Avis et al. | 348/451 |
| 5,025,495 A | * | 6/1991 | Avis | 348/452 |
| 5,027,203 A | * | 6/1991 | Samad et al. | 348/441 |
| 5,027,205 A | * | 6/1991 | Avis et al. | 348/441 |
| 5,036,393 A | * | 7/1991 | Samad et al. | 348/452 |
| 5,515,388 A | * | 5/1996 | Yagasaki | 714/800 |
| 5,801,975 A | * | 9/1998 | Thayer et al. | 708/402 |
| 5,818,535 A | * | 10/1998 | Asnis et al. | 348/416.1 |
| 5,845,112 A | * | 12/1998 | Nguyen et al. | 712/221 |
| 5,893,145 A | * | 4/1999 | Thayer et al. | 711/125 |
| 5,909,572 A | * | 6/1999 | Thayer et al. | 712/226 |

(Continued)

FOREIGN PATENT DOCUMENTS
JP     2006-331136 A     12/2006
(Continued)

*Primary Examiner* — Christopher S Kelley
*Assistant Examiner* — Asmamaw G Tarko
(74) *Attorney, Agent, or Firm* — Nath, Goldberg & Meyer; Jerald L. Meyer; Stanley N. Protigal

(57) ABSTRACT

A motion vector detecting apparatus includes a correlation detecting unit, a repetitive object detecting unit and a motion vector detecting unit. The correlation detecting unit detects correlations among plural pieces of pixel data in plural directions. The repetitive object detecting unit detects whether or not concerned pixel data in which a motion vector is to be detected is located in a repetitive object. The motion vector detecting unit decreases a difference value in a direction coincident with a direction of motion vector having detected at a past time when the concerned pixel data is located in the repetitive object and detects a motion vector.

8 Claims, 17 Drawing Sheets

U.S. PATENT DOCUMENTS

| | | | | |
|---|---|---|---|---|
| 5,941,938 A | * | 8/1999 | Thayer | 708/490 |
| 6,009,505 A | * | 12/1999 | Thayer et al. | 712/6 |
| 6,047,372 A | * | 4/2000 | Thayer et al. | 712/222 |
| 6,061,521 A | * | 5/2000 | Thayer et al. | 712/9 |
| 6,141,673 A | * | 10/2000 | Thayer et al. | 708/402 |
| 6,144,699 A | * | 11/2000 | Albin et al. | 375/240.16 |
| 6,154,831 A | * | 11/2000 | Thayer et al. | 712/208 |
| 6,160,901 A | * | 12/2000 | Kage | 382/107 |
| 6,173,366 B1 | * | 1/2001 | Thayer et al. | 711/129 |
| 6,298,438 B1 | * | 10/2001 | Thayer et al. | 712/226 |
| 7,460,172 B2 | * | 12/2008 | Min | 348/441 |
| 2010/0265406 A1 | * | 10/2010 | Shishido et al. | 348/699 |
| 2011/0007209 A1 | * | 1/2011 | Koizumi et al. | 348/441 |

FOREIGN PATENT DOCUMENTS

JP    2007-235403 A    9/2007

* cited by examiner

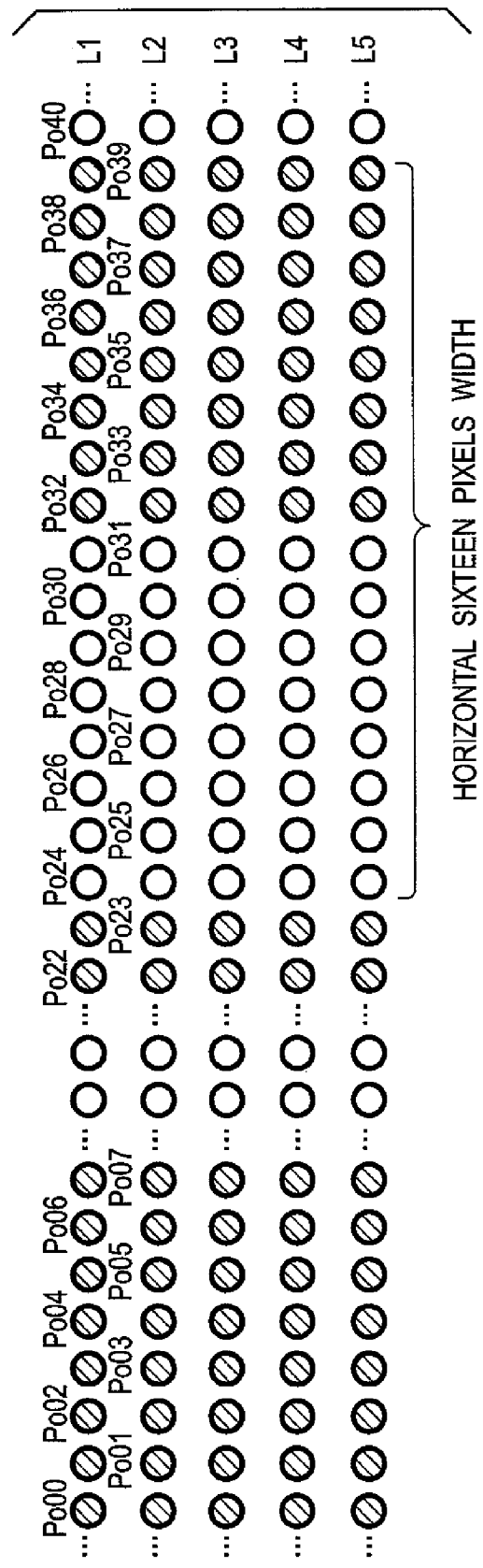

FIG. 5

| | D20sum | D19sum | D18sum | D17sum | D16sum | D15sum | D14sum | D13sum | D12sum | D11sum | D10sum | D09sum | D08sum | D07sum | D06sum | D05sum | D04sum | D03sum | D02sum |
|---|---|---|---|---|---|---|---|---|---|---|---|---|---|---|---|---|---|---|---|
| (A) | 30 | 30 | 30 | 30 | 0 | 0 | 0 | 0 | 30 | 30 | 30 | 30 | 0 | 0 | 0 | 0 | 30 | 30 | 30 |
| (B) | 30 | 30 | 30 | 0 | 0 | 0 | 0 | 30 | 30 | 30 | 30 | 0 | 0 | 0 | 0 | 30 | 30 | 30 | 30 |
| (C) | 30 | 30 | 0 | 0 | 0 | 0 | 30 | 30 | 30 | 30 | 0 | 0 | 0 | 0 | 30 | 30 | 30 | 30 | 0 |
| (D) | 30 | 0 | 0 | 0 | 0 | 30 | 30 | 30 | 30 | 0 | 0 | 0 | 0 | 30 | 30 | 30 | 30 | 0 | 0 |
| (E) | 30 | 30 | 30 | 30 | 0 | 0 | 0 | 0 | 30 | 30 | 30 | 30 | 0 | 0 | 0 | 0 | 30 | 30 | 30 |
| (F) | 30 | 30 | 30 | 0 | 0 | 0 | 0 | 30 | 30 | 30 | 30 | 0 | 0 | 0 | 0 | 30 | 30 | 30 | 30 |
| (G) | 30 | 30 | 0 | 0 | 0 | 0 | 30 | 30 | 30 | 30 | 0 | 0 | 0 | 0 | 30 | 30 | 30 | 30 | 0 |
| (H) | 30 | 0 | 0 | 0 | 0 | 30 | 30 | 30 | 30 | 0 | 0 | 0 | 0 | 30 | 30 | 30 | 30 | 0 | 0 |
| (I) | 30 | 30 | 30 | 30 | 0 | 0 | 0 | 0 | 30 | 30 | 30 | 30 | 0 | 0 | 0 | 0 | 30 | 30 | 30 |
| (J) | 30 | 30 | 30 | 0 | 0 | 0 | 0 | 30 | 30 | 30 | 30 | 0 | 0 | 0 | 0 | 30 | 30 | 30 | 30 |
| (K) | 30 | 30 | 0 | 0 | 0 | 0 | 30 | 30 | 30 | 30 | 0 | 0 | 0 | 0 | 30 | 30 | 30 | 30 | 0 |
| (L) | 30 | 0 | 0 | 0 | 0 | 30 | 30 | 30 | 30 | 0 | 0 | 0 | 0 | 30 | 30 | 30 | 30 | 0 | 0 |
| (M) | 30 | 30 | 30 | 30 | 0 | 0 | 0 | 0 | 30 | 30 | 30 | 30 | 0 | 0 | 0 | 0 | 30 | 30 | 30 |
| (N) | 30 | 30 | 30 | 0 | 0 | 0 | 0 | 30 | 30 | 30 | 30 | 0 | 0 | 0 | 0 | 30 | 30 | 30 | 30 |
| (O) | 30 | 30 | 0 | 0 | 0 | 0 | 30 | 30 | 30 | 30 | 0 | 0 | 0 | 0 | 30 | 30 | 30 | 30 | 0 |
| (P) | 30 | 0 | 0 | 0 | 0 | 30 | 30 | 30 | 30 | 0 | 0 | 0 | 0 | 30 | 30 | 30 | 30 | 0 | 0 |
| (Q) | 30 | 30 | 30 | 30 | 0 | 0 | 0 | 0 | 30 | 30 | 30 | 30 | 0 | 0 | 0 | 0 | 30 | 30 | 30 |
| (R) | 30 | 30 | 30 | 0 | 0 | 0 | 0 | 30 | 30 | 30 | 30 | 0 | 0 | 0 | 0 | 30 | 30 | 30 | 30 |
| (S) | 30 | 30 | 0 | 0 | 0 | 0 | 30 | 30 | 30 | 30 | 0 | 0 | 0 | 0 | 30 | 30 | 30 | 30 | 0 |
| (T) | 30 | 0 | 0 | 0 | 0 | 30 | 30 | 30 | 30 | 0 | 0 | 0 | 0 | 30 | 30 | 30 | 30 | 0 | 0 |
| | Acc20 | Acc19 | Acc18 | Acc17 | Acc16 | Acc15 | Acc14 | Acc13 | Acc12 | Acc11 | Acc10 | Acc09 | Acc08 | Acc07 | Acc06 | Acc05 | Acc04 | Acc03 | Acc02 |
| (U) | 600 | 450 | 300 | 150 | 0 | 90 | 180 | 270 | 360 | 270 | 180 | 90 | 0 | 30 | 60 | 90 | 120 | 90 | 60 |

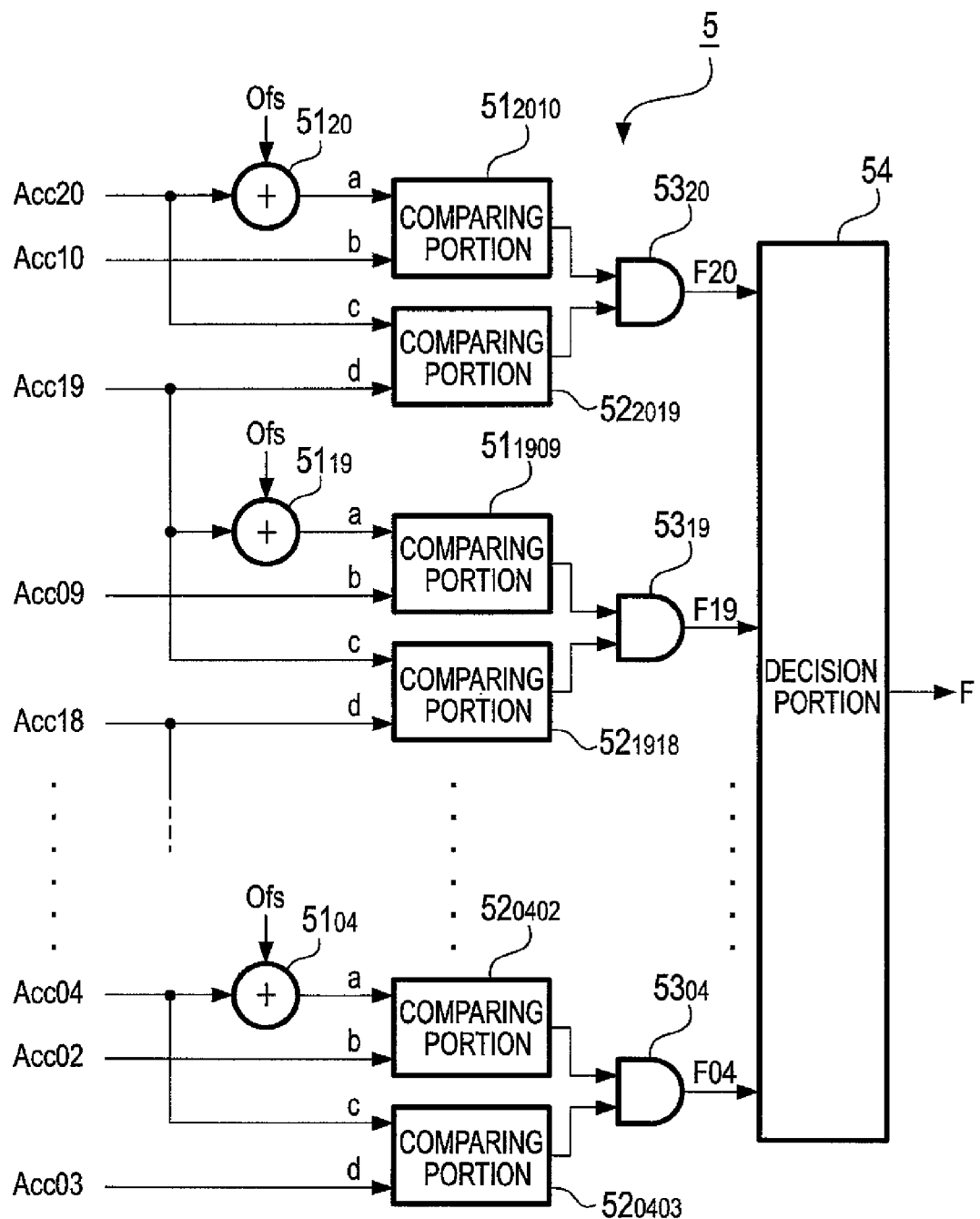

FIG. 7

| | | | |
|---|---|---|---|
| COMPARING PORTION 522010 | 0 | AND CIRCUIT 5220 | 0 |
| COMPARING PORTION 522019 | 0 | | |
| COMPARING PORTION 521909 | 0 | AND CIRCUIT 5219 | 0 |
| COMPARING PORTION 521918 | 0 | | |
| COMPARING PORTION 521809 | 0 | AND CIRCUIT 5218 | 0 |
| COMPARING PORTION 521817 | 0 | | |
| COMPARING PORTION 521708 | 0 | AND CIRCUIT 5217 | 0 |
| COMPARING PORTION 521716 | 0 | | |
| COMPARING PORTION 521608 | 0 | AND CIRCUIT 5216 | 0 |
| COMPARING PORTION 521615 | 1 | | |
| COMPARING PORTION 521507 | 0 | AND CIRCUIT 5215 | 0 |
| COMPARING PORTION 521514 | 1 | | |
| COMPARING PORTION 521407 | 0 | AND CIRCUIT 5214 | 0 |
| COMPARING PORTION 521413 | 1 | | |
| COMPARING PORTION 521306 | 0 | AND CIRCUIT 5213 | 0 |
| COMPARING PORTION 521312 | 1 | | |
| COMPARING PORTION 521206 | 0 | AND CIRCUIT 5212 | 0 |
| COMPARING PORTION 521211 | 0 | | |
| COMPARING PORTION 521105 | 0 | AND CIRCUIT 5211 | 0 |
| COMPARING PORTION 521110 | 0 | | |
| COMPARING PORTION 521005 | 0 | AND CIRCUIT 5210 | 0 |
| COMPARING PORTION 521009 | 0 | | |
| COMPARING PORTION 520904 | 0 | AND CIRCUIT 5209 | 0 |
| COMPARING PORTION 520908 | 0 | | |
| COMPARING PORTION 520804 | 1 | AND CIRCUIT 5208 | 1 |
| COMPARING PORTION 520807 | 1 | | |
| COMPARING PORTION 520703 | 0 | AND CIRCUIT 5207 | 0 |
| COMPARING PORTION 520706 | 1 | | |
| COMPARING PORTION 520603 | 0 | AND CIRCUIT 5206 | 0 |
| COMPARING PORTION 520605 | 1 | | |
| COMPARING PORTION 520502 | 0 | AND CIRCUIT 5205 | 0 |
| COMPARING PORTION 520504 | 1 | | |
| COMPARING PORTION 520402 | 0 | AND CIRCUIT 5204 | 0 |
| COMPARING PORTION 520403 | 0 | | |

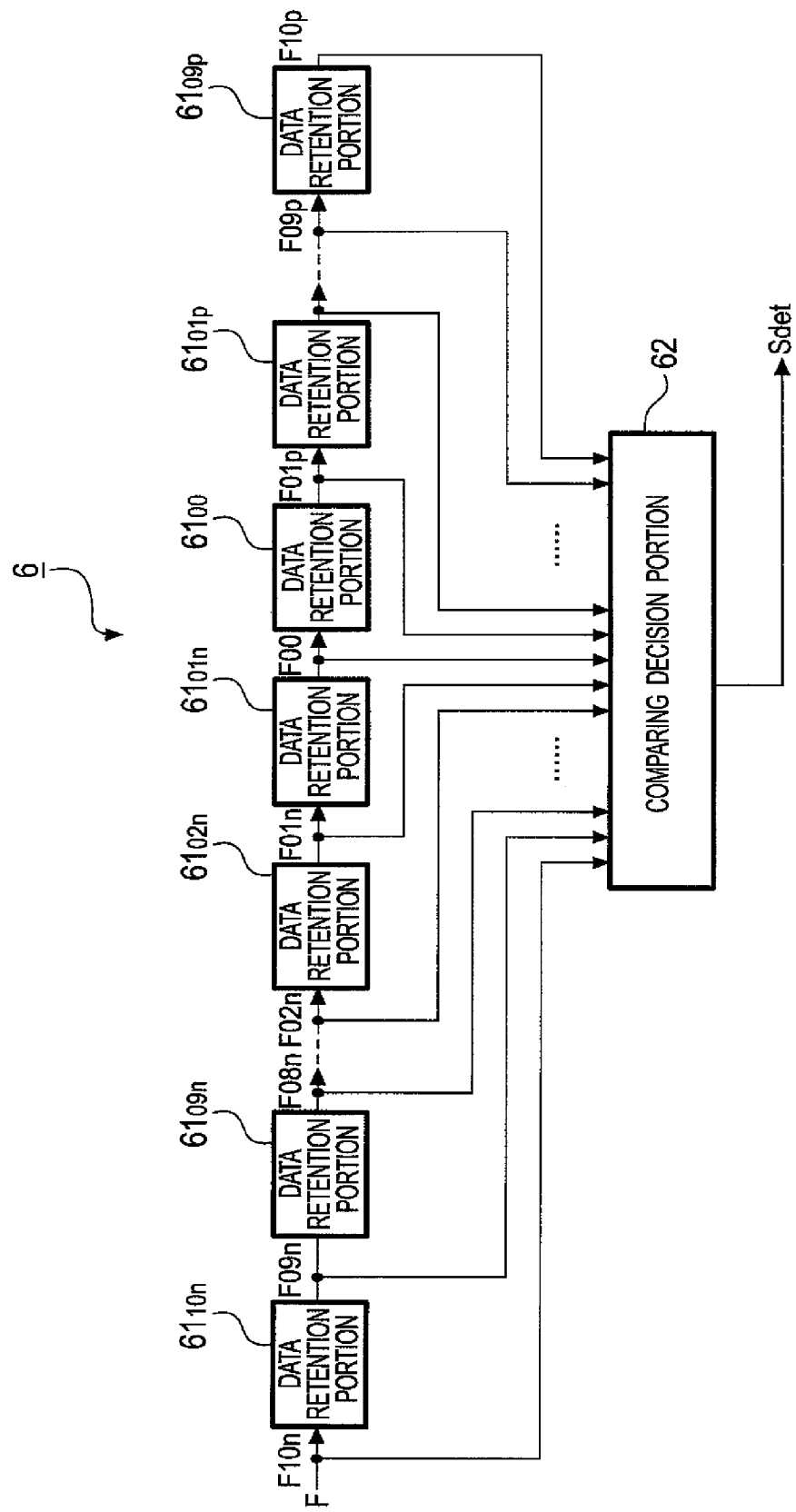

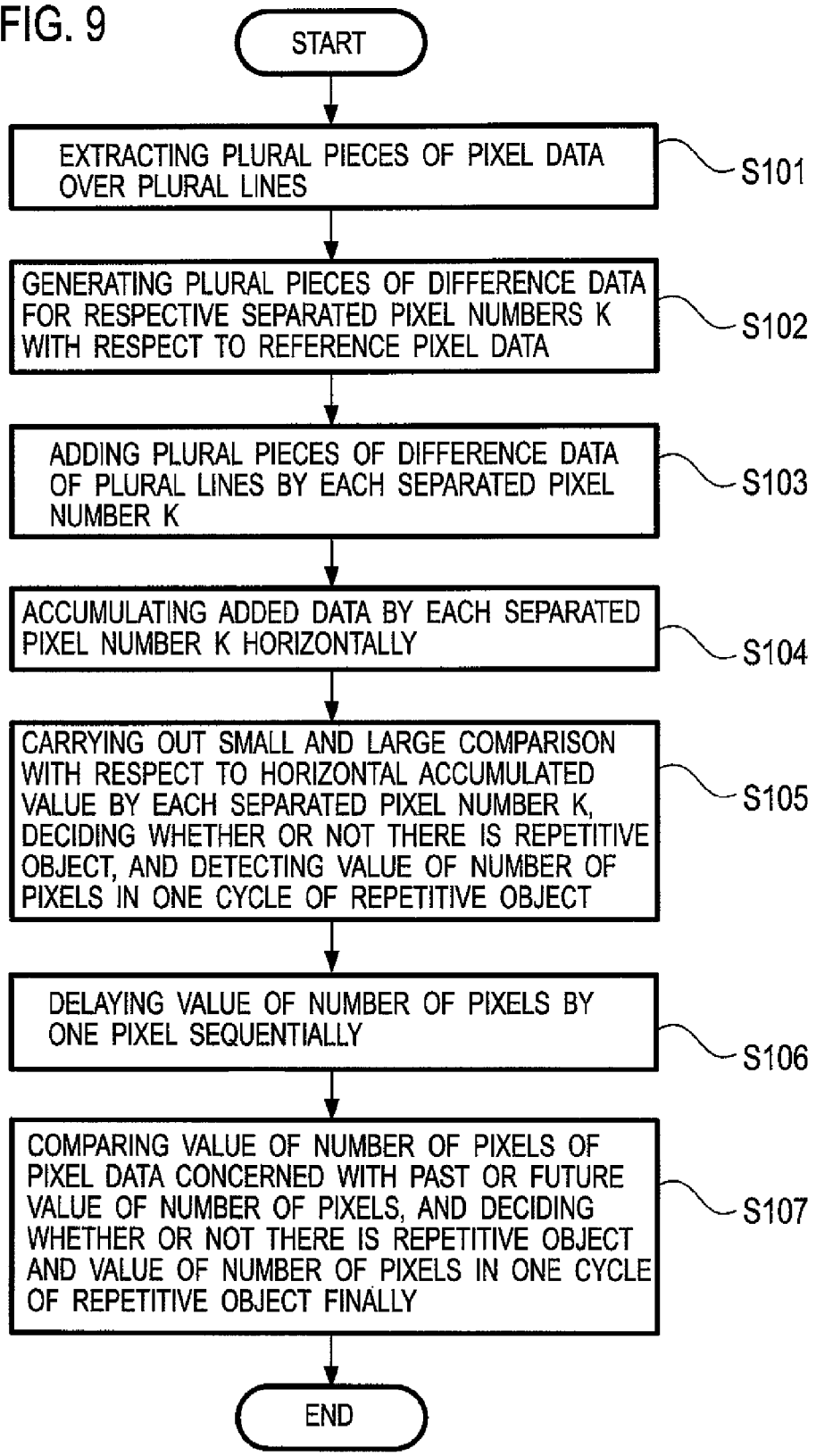

MOTION VECTOR DETECTING APPARATUS AND MOTION VECTOR DETECTING METHOD

BACKGROUND OF THE INVENTION

1. Field of the Invention

The present invention relates to a motion vector detecting apparatus and a motion vector detecting method that detect a motion vector of a video signal, more specifically, to a motion vector detecting apparatus and a motion vector detecting method that reduce false detection of the motion vector, in a case where there is a repetitive object such as a striped pattern that is a pattern in which pixel data representing a certain gray level (luminance level) or color appears in a horizontal or vertical direction in a repetitive manner.

2. Description of the Related Art

A video signal display apparatus employs a motion vector at a time of video signal processing such as I/P conversion for converting a video signal of an interlaced signal into a progressive signal, or frame frequency conversion for increasing a frame frequency of a video signal several times such as two times. In a case where a video to be displayed on the video signal display apparatus includes a repetitive object such as a striped pattern in which pixel data representing a certain gray level (luminance level) or color appears in a horizontal or vertical direction in a repetitive manner, there is a high possibility that a motion vector detecting unit within a I/P conversion circuit or a frame frequency conversion circuit incorrectly detects a motion vector, in comparison with a video that does not include a repetitive object.

So, it is possible to reduce false detection of the motion vector by detecting whether or not a repetitive object is included in a video and devising a motion vector detecting method if there is the repetitive object. Patent document 1 (Japanese Unexamined Patent Application Publication No. 2007-235403) describes the fact that there is false detection of a motion vector frequently when a video includes a repetitive object, and a method for reducing false detection of a motion vector when there is a repetitive object. Patent document 2 (Japanese Unexamined Patent Application Publication No. 2006-331136) describes reference to a motion vector having been detected when a motion vector of a video signal is detected.

The invention cited in Patent document 1 destroys a motion vector when detecting a repetitive object, which does not expect an effect for reducing false detection of a motion vector so much. So, it is hoped to develop a motion vector detecting apparatus and a motion vector detecting method with new concept capable of reducing false detection of a motion vector using the result of detection whether or not there is a repetitive object.

In addition, it is necessary to efficiently detect a repetitive object in order to reduce false detection of a motion vector. Since a repetitive cycle of pixel data representing a certain gray level or color differs by video, it is hoped to efficiently detect a repetitive object even if the repetitive object has any of repetitive patterns. In the repetitive object detecting method cited in Patent document 1, an effect for efficiently detecting a repetitive object is not expected so much. Therefore, it is hoped to develop a motion vector detecting apparatus and a motion vector detecting method with a new concept capable of efficiently detecting a repetitive object and reducing false detection of a motion vector using the result of detection whether or not there is a repetitive object.

SUMMARY OF THE INVENTION

The present invention has an object to provide a motion vector detecting apparatus and a motion vector detecting method capable of reducing false detection of a motion vector using the result of detection whether or not there is a repetitive object. The present invention has another object to provide a motion vector detecting apparatus and a motion vector detecting method capable of efficiently detecting a repetitive object and reducing false detection of a motion vector using the high accuracy result of detection whether or not there is a repetitive object.

In order to achieve the above object, the present invention provides a motion vector detecting apparatus comprising: a correlation detecting unit configured to calculate difference values in a plurality of directions each between two pieces of pixel data in at least two frames and detect correlations each between two pieces of pixel data in the plurality of directions; a repetitive object detecting unit configured to detect whether or not concerned pixel data in which a motion vector is to be detected is located in a repetitive object in which pixel data representing a certain gray level or color is repeated in a certain pattern in a horizontal or vertical direction; a motion vector selecting unit configured to select a motion vector based on the difference values in the plurality of directions from the correlation detecting unit and output the selected motion vector; and a motion vector compensating unit configured to, when the repetitive object detecting unit detects that the concerned pixel data is located in the repetitive object, render a motion vector, which has been detected in a past time with respect to a motion vector newly detected from the concerned pixel data, to be easy to be output as a motion vector.

In a preferred embodiment of the present invention, the motion vector compensating unit comprises: a correlation compensation gain generating portion configured to generate a gain for decreasing a difference value in a direction coincident with a direction of motion vector having detected at a past time among the difference values in the plurality of directions and decreasing a difference value in the direction coincident with the direction of motion vector at a time when the repetitive object detecting unit detects that the concerned pixel data is located in the repetitive object so as to be smaller than a difference value in the direction coincident with the direction of motion vector at a time when the repetitive object detecting unit does not detect that the concerned pixel data is located in the repetitive object; and a correlation compensating portion configured to respectively multiply the difference values in the plurality of directions from the correlation detecting unit by gains generated by the correlation compensation gain generating portion, wherein the motion vector selecting unit selects as a motion vector a direction having the smallest difference value among the compensated difference values in the plurality of directions from the correlation compensating portion, and outputs the selected motion vector.

In a preferred embodiment of the present invention, the correlation compensation gain generating portion comprises: comparators each of which individually retains each of motion vectors in the plurality of directions, and compares the motion vector having been detected at past time with the retained motion vector; accumulators each of which accumulates a comparison result from each of the comparators; and compensators each of which increases an accumulated value from each of the accumulators and outputs an inverse of the increases accumulated value as a gain when the repetitive object detecting unit detects that the concerned pixel data is located in the repetitive object, and outputs an inverse of an accumulated value from each of the accumulators as a gain when the repetitive object detecting unit does not detect that the concerned pixel data is located in the repetitive object.

In a preferred embodiment of the present invention, the repetitive object detecting unit comprises: a difference calculation portion configured to carry out, with respect to lines of a video signal, a process for setting as reference pixel data pixel data located at an end of pieces of pixel data within a certain range of pixel data alignment in one line of the video signal, and calculating a difference between the reference pixel data and each piece of pixel data within a range from pixel data separated from the reference pixel data by two pixels to pixel data separated from the reference pixel data by the maximum number of pixels in the pieces of pixel data so as to obtain difference data by each of separated pixel numbers; an adding portion configured to add pieces of difference data obtained with respect to the lines of the video signal by the difference calculation portion by each of the separated pixel numbers so as to obtain added data by each of the separated pixel numbers; a horizontal direction accumulating portion configured to sequentially delay the added data obtained by each of the separated pixel numbers for a time corresponding to one pixel within a range from a time corresponding to one pixel to a time corresponding to a pixel number generated by subtracting one from each of the separated pixel numbers, and accumulate added data before the delaying and all delayed pieces of added data so as to obtain a horizontal accumulated value by each of the separated pixel numbers in which added data obtained by each of the separated pixel numbers is accumulated in a horizontal direction; and a small and large comparing portion configured to carry out a small and large comparison with respect to the horizontal accumulated value obtained by each of the separated pixel numbers by the horizontal direction accumulating portion so as to decide whether or not the reference pixel data is located in a repetitive object including a certain repetitive pattern.

In order to achieve the above object, the present invention provides a motion vector detecting method comprising: generating difference values in a plurality of directions each between two pieces of pixel data in at least two frames; detecting whether or not concerned pixel data in which a motion vector is to be detected is located in a repetitive object in which pixel data representing a certain gray level or color is repeated in a certain pattern in a horizontal or vertical direction; selecting a motion vector based on the difference values in the plurality of directions generated in the generating; and replacing a motion vector which is newly detected from the concerned pixel data with a motion vector which has been detected in a past time, when the detecting detects that the concerned pixel data is located in the repetitive object, and outputting the replaced motion vector.

In order to achieve the above object, the present invention provides a motion vector detecting method comprising: generating difference values in a plurality of directions each between two pieces of pixel data in at least two frames; detecting whether or not concerned pixel data in which a motion vector is to be detected is located in a repetitive object in which pixel data representing a certain gray level or color is repeated in a certain pattern in a horizontal or vertical direction; generating a gain for decreasing a difference value in a direction coincident with a direction of motion vector having detected at a past time among the difference values in the plurality of directions, and decreasing a difference value in the direction coincident with the direction of motion vector at a time when the repetitive object detecting unit detects that the concerned pixel data is located in the repetitive object so as to be smaller than a difference value in the direction coincident with the direction of motion vector at a time when the repetitive object detecting unit does not detect that the concerned pixel data is located in the repetitive object; multiplying the difference values in the plurality of directions generated in the generating by gains generated in the generating to compensate the difference values in the plurality of directions; and selecting as a motion vector a direction having the smallest difference value among the compensated difference values in the plurality of directions.

In a preferred embodiment of the present invention, the detecting comprises: extracting pieces of pixel data within a certain range of pixel data alignment in one line of a video signal with respect to lines of the video signal; setting as reference pixel data pixel data located at an end of the pieces of pixel data with respect to the lines of the video signal, and calculating a difference between the reference pixel data and each piece of pixel data within a range from pixel data separated from the reference pixel data by two pixels to pixel data separated from the reference pixel data by the maximum number of pixels in the pieces of pixel data so as to obtain difference data by each of separated pixel numbers; adding pieces of difference data obtained with respect to the lines of the video signal by each of the separated pixel numbers so as to obtain added data by each of the separated pixel numbers; sequentially delaying the added data obtained by each of the separated pixel numbers for a time corresponding to one pixel within a range from a time corresponding to one pixel to a time corresponding to a pixel number generated by subtracting one from each of the separated pixel numbers, and accumulating added data before the delaying and all delayed pieces of added data so as to obtain a horizontal accumulated value by each of the separated pixel numbers in which added data obtained by each of the separated pixel numbers is accumulated in a horizontal direction; and carrying out a small and large comparison with respect to the horizontal accumulated value obtained by each of the separated pixel numbers so as to decide whether or not the reference pixel data is located in a repetitive object including a certain repetitive pattern.

According to the present invention, the motion vector detecting apparatus and the motion vector detecting method can reduce false detection of a motion vector using the result of detection whether or not there is a repetitive object. According to the present invention, the motion vector detecting apparatus and the motion vector detecting method can efficiently detect a repetitive object and reduce false detection of a motion vector using the high accuracy result of detection whether or not there is a repetitive object.

BRIEF DESCRIPTION OF THE DRAWINGS

FIG. 2A is a diagram that illustrates an example of pixel data arrangement of a repetitive object in a horizontal direction.

FIG. 5 is a diagram that illustrates a concrete numerical example of nineteen pieces of added data $D20_{sum}$ to $D02_{sum}$ and horizontal direction accumulated values Acc20 to Acc02 in the example of pixel data arrangement in FIGS. 2A to 2B.

FIG. 6 is a block diagram that illustrates a concrete configuration example of a small and large comparing unit 5 in FIG. 1.

FIG. 7 is a diagram that illustrates output values of respective comparing portions and respective AND circuits in FIG. 6.

FIG. 8 is a block diagram that illustrates a concrete configuration example of a horizontal direction repetitive decision unit 6 in FIG. 1.

FIG. 9 is a flowchart that explains workings of the repetitive object detecting device shown in FIG. 1.

DESCRIPTION OF THE EMBODIMENTS

A motion vector detecting apparatus and a motion vector detecting method according to the present invention will be described below, with reference to the attached drawings. After a concrete configuration and workings of a repetitive object detecting device employed in the motion vector detecting apparatus are described, the motion vector detecting apparatus and the motion vector detecting method according to each exemplary embodiment of the present invention are described. As the repetitive object detecting device, there are a first configuration example that detects a repetitive object which repeats pixel data representing a certain gray level (luminance level) or color in a horizontal direction, and a second configuration example that detects a repetitive object which repeats pixel data representing a certain gray level (luminance level) or color in a vertical direction. A motion vector detecting apparatus and a motion vector detecting method according to a first exemplary embodiment of the present invention employ the repetitive object detecting device having the first configuration example therein. A motion vector detecting apparatus and a motion vector detecting method according to a second exemplary embodiment of the present invention employ the repetitive object detecting device having the second configuration example therein. A motion vector detecting apparatus and a motion vector detecting method according to a third exemplary embodiment of the present invention employ the repetitive object detecting device having the first and second configuration examples therein.

First Exemplary Embodiment

Figure 1:
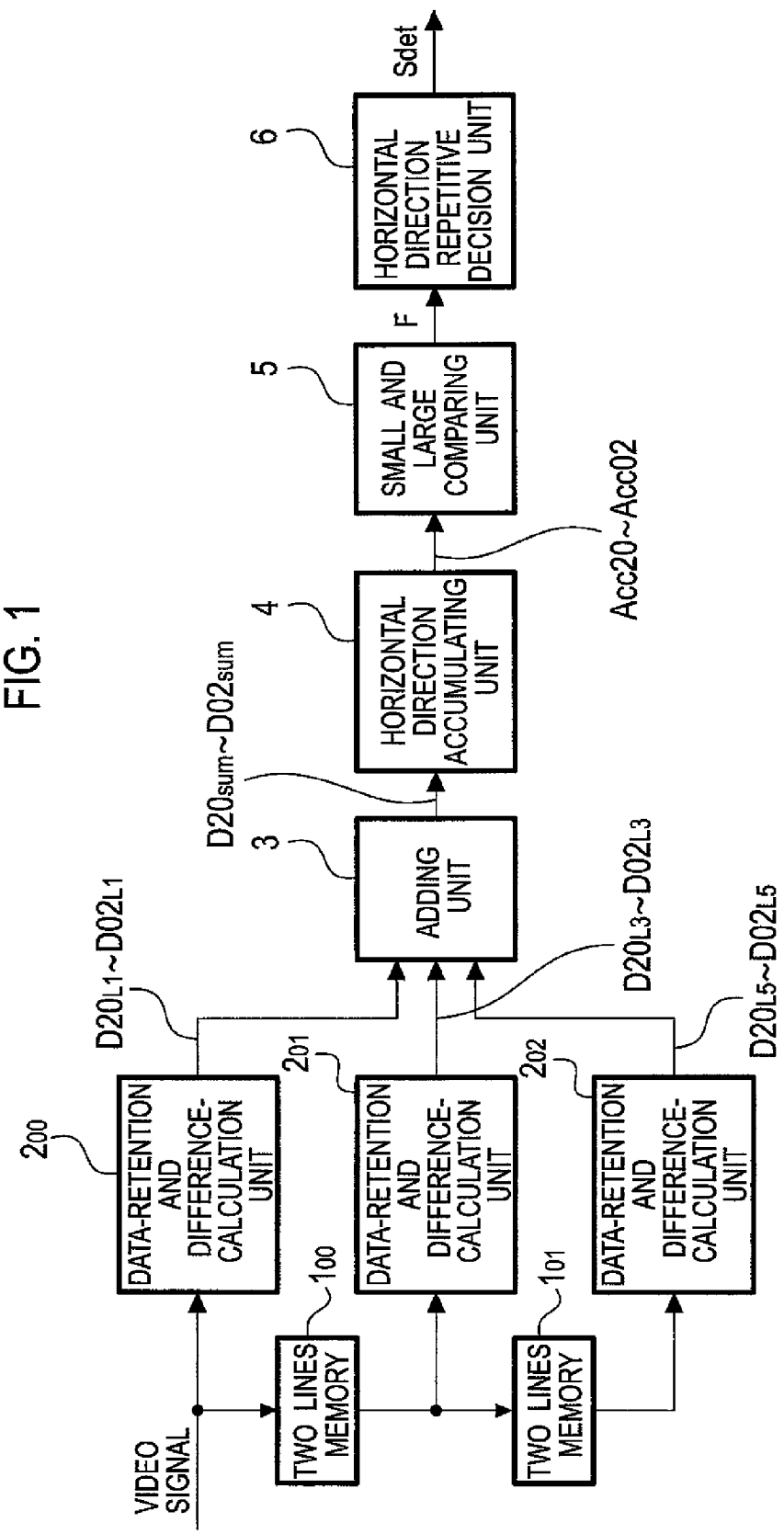
FIG. 1 is a block diagram that illustrates a whole configuration example of a repetitive object detecting device according to a first exemplary embodiment of the present invention.

FIG. 1 is a block diagram that illustrates a whole configuration of the repetitive object detecting device having the first configuration example. In FIG. 1, a video signal is input into a two lines memory $1_{00}$ and a data-retention and difference-calculation unit $2_{00}$. It is noted that as the video signal, any of a luminance signal, a color signal (color difference signal) and a composite signal may be cited. In the first configuration example, an input video signal will be described as a luminance signal. As one example, as shown in FIG. 2A, the luminance signal is a signal with a striped pattern in which a line having a repetitive pattern, which includes eight pixels of black indicated by circles with hatching and eight pixels of white indicated by circles with non-hatching alternately repeated in a horizontal direction, is repeated in a vertical direction. Here, while the striped pattern in which the number of pixels of black is equal to the number of pixels of white in the horizontal direction is cited as one example, another striped pattern in which the numbers of both pixels differ from each other may be used.

FIG. 2A shows five lines L1 to L5 each on which data of forty-one pixels $P_0 00$ to $P_0 40$ are aligned in the horizontal direction. A repetitive cycle is called a M-pixels width (integer M≧2). The example illustrated in FIG. 2A uses the repetitive pattern that includes a sixteen-pixels width in the horizontal direction. A pixel width is defined as the number of pixels included in one cycle of repetitive pattern.

In FIG. 1, the two lines memory $1_{00}$ delays pixel data of a luminance signal input sequentially by two lines. Pixel data output from the two lines memory $1_{00}$ is input into a two lines memory $1_{01}$ and a data-retention and difference-calculation unit $2_{01}$. The two lines memory $1_{01}$ further delays input pixel data by two lines. Pixel data output from the two lines memory $1_{01}$ is input into a data-retention and difference-calculation unit $2_{02}$. Therefore, if pixel data to be input to the two lines memory $1_{00}$ and the data-retention and difference-calculation unit $2_{00}$ is the data in the line L1 shown in FIG. 2A, pixel data to be input to the data-retention and difference-calculation unit $2_{01}$ is the data in the line L3 older than the line L1 by two lines, and pixel data to be input to the data-retention and difference-calculation unit $2_{02}$ is the data in the line L5 older than the line L3 by two lines.

Figure 2B:
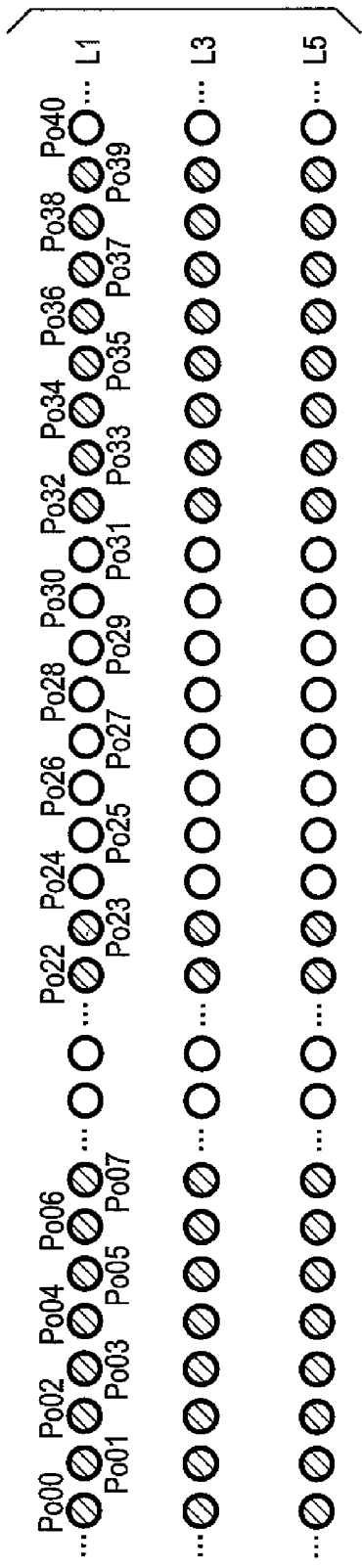
FIG. 2B is a diagram that illustrates an example of pixel data arrangement of a repetitive object in a horizontal direction.

As will be described later, since the data-retention and difference-calculation units $2_{00}$ to $2_{02}$ sequentially delay pixel data in the horizontal direction and retain the pixel data, the repetitive object detecting device and the repetitive object detecting method having the first configuration example detect a repetitive object using three pieces of pixel data in three lines each of which is one line extracted from two lines in the vertical direction, as shown in FIG. 2B. While FIG. 1 illustrates the configuration that employs the two line memories $1_{00}$ and $1_{01}$ to facilitate understanding, another configuration where pixel data is substantially delayed by two lines by employing a line memory that delays pixel data by one line and updates read-and-write with respect to the line memory once every two lines may be used.

Further, while a repetitive object is detected using three pieces of pixel data in three lines each extracted by jumping one line in the vertical direction, plural pieces of pixel data in plural lines each extracted by jumping two or more lines or plural pieces of pixel data in plural sequential lines may be used. The number of lines used in the detecting is not limited to three, and plural lines adequately set may be used. As the number of lines used in the detecting is increased, false detection is reduced. In a case of updating read-and-write with respect to a line memory once every n lines (integer n≧1) to generate plural lines each extracted by jumping (n−1) lines, a repetitive object can be detected using plural pieces of pixel data in the plural lines included within a certain range in the vertical direction without increasing the number of line memories.

Figure 3:
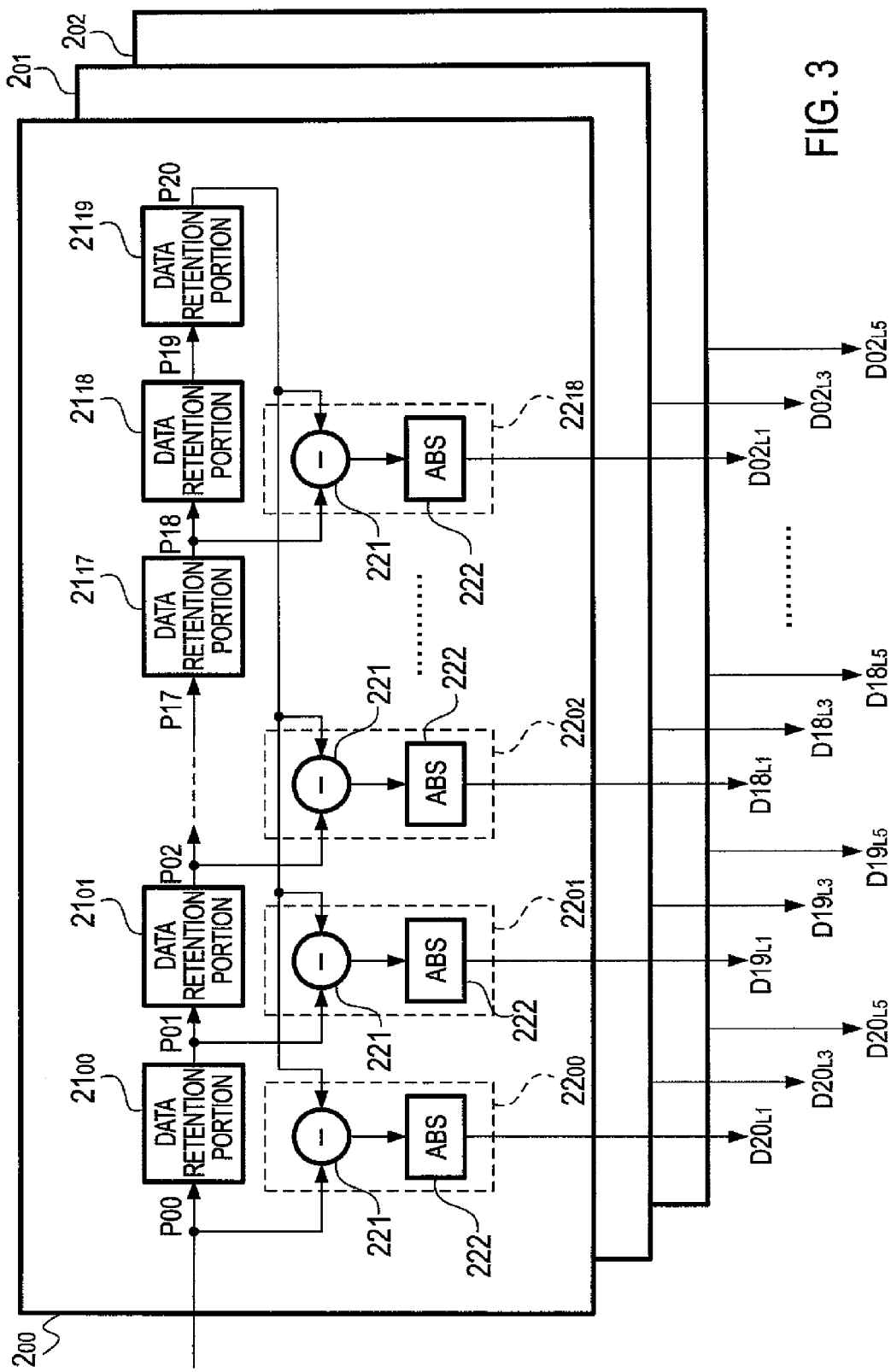
FIG. 3 is a block diagram that illustrates a concrete configuration example of data-retention and difference-calculation units $2_{00}$ to $2_{02}$ in FIG. 1.

FIG. 3 illustrates a concrete configuration of the data-retention and difference-calculation units $2_{00}$ to $2_{02}$. Since the data-retention and difference-calculation units $2_{00}$ to $2_{02}$ have the same configuration one another, FIG. 3 shows only an inner configuration of the data-retention and difference-calculation unit $2_{00}$. In FIG. 3, each of data retention portions $21_{00}$ to $21_{19}$ retains pixel data for a time corresponding to two pixels (two clocks) and outputs it. Therefore, for forty-one pieces of pixel data $P_0 00$ to $P_0 40$ in the respective lines L1, L3 and L5 shown in FIG. 2B, pixel data of one pixel is extracted from two pixels in the horizontal direction by the respective data retention portions $21_{00}$ to $21_{19}$. A data retention portion 21 to which an index is not assigned is one in which any of the data retention portions $21_{00}$ to $21_{19}$ is not identified. Since the example illustrated in FIG. 3 includes twenty data retention portions 21, twenty pieces of pixel data of twenty pixels are obtained from the data retention portions $21_{00}$ to $21_{19}$ by delaying pixel data input to the data retention portion $21_{00}$ by two pixels in series from two to forty pixels.

Figure 2C:
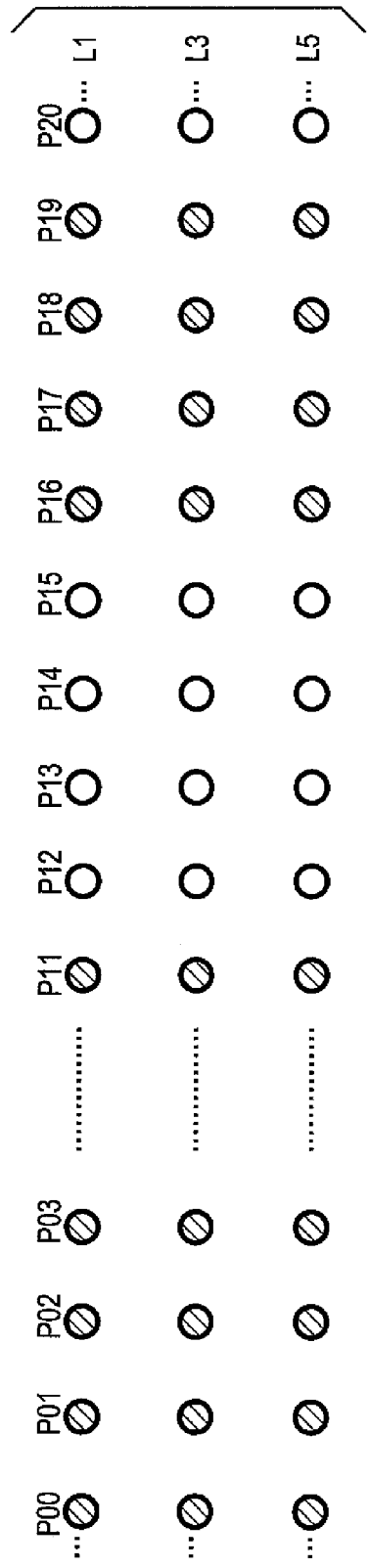
FIG. 2C is a diagram that illustrates an example of pixel data arrangement of a repetitive object in a horizontal direction.

Pixel data input to the data retention portion $21_{00}$ is called P00, and twenty pieces of pixel data output from the data retention portions $21_{00}$ to $21_{19}$ are called P01 to P20. As shown in FIG. 2C, the data-retention and difference-calculation units $2_{00}$, $2_{01}$ and $2_{02}$ carry out difference calculation, which will be described later, using twenty-one pieces of pixel data P00 to P20 in the line L1, twenty-one pieces of pixel data P00 to P20 in the line L3 and twenty-one pieces of pixel data P00 to P20 in the line L5 respectively. It is noted that as will be noted from comparing FIG. 2A to FIG. 2C, pixel data $P_0 00$, $P_0 02$, $P_0 04$ . . . input to the repetitive object detecting device before the extracting, correspond to pixel data P00, P01, P02 . . . after the extracting by the data-retention and difference-calculation units $2_{00}$ to $2_{02}$.

Here, while a repetitive object is detected using input pixel data P00 and twenty pieces of pixel data P01 to P20 each extracted by jumping one pixel in the horizontal direction, plural sequential pixels may be used. The number of pixels in the horizontal direction to be used in the detecting is especially not limited, and plural pixels adequately set may be used. If the number of pixels to be used in the detecting is large, a repetitive pattern with a wide pixel width (long cycle) can be detected. The number of pixels in the horizontal direction may be set according to a pixel width to be detected. Since the first configuration example uses plural pixels each extracted by jumping one pixel, a repetitive object can be detected without comparatively increasing the number of circuits in the data-retention and difference-calculation unit $2_{00}$ to $2_{02}$.

As shown in FIG. 3, each of the data-retention and difference-calculation units $2_{00}$ to $2_{02}$ includes difference data generating portions $22_{00}$ to $22_{18}$. Each of the difference data generating portions $22_{00}$ to $22_{18}$ includes a subtractor 221 and an absolute value returning portion (ABS) 222. Firstly, workings of the difference data generating portions $22_{00}$ to $22_{18}$ in each of the data-retention and difference-calculation units $2_{00}$ to $2_{02}$ will be described. The substractor 221 in the difference data generating portion $22_{00}$ gets the difference between pixel data P20 which is reference pixel data and pixel data P00 which is future pixel data younger than the pixel data P20 by twenty pixels in FIG. 2C. The absolute value returning portion 222 in the difference data generating portion $22_{00}$ returns an absolute value of output from the substractor 221 and outputs difference data $D20_{L1}$. The difference data $D20_{L1}$ represents the difference between two pieces of pixel data separated from each other by twenty pixels in a pixel data alignment of the line L1 shown in FIG. 2C.

As well as the difference data generating portion $22_{00}$, the difference data generating portion $22_{01}$ gets the difference between the pixel data P20 and pixel data P01, returns an absolute value of the difference, and outputs difference data $D19_{L1}$. The difference data $D19_{L1}$ represents the difference between two pieces of pixel data separated from each other by nineteen pixels in the pixel data alignment of the line L1 shown in FIG. 2C. As well, each of the difference data generating portions $22_{02}$ to $22_{18}$ gets the difference between the pixel data P20 and each of seventeen pieces of pixel data P02 to P18, returns an absolute value of the difference, and outputs each of seventeen pieces of difference data $D18_{L1}$ to $D02_{L1}$. Each of the seventeen pieces of difference data $D18_{L1}$ to $D02_{L1}$ represents the difference between two pieces of pixel data separated from each other by each of eighteen to two pixels in the pixel data alignment of the line L1 shown in FIG. 2C. In the first configuration example, difference data between the pixel data P20 and pixel data P19 are not used.

As well as the data-retention and difference-calculation unit $2_{00}$, each of the difference data generating portions $22_{00}$ to $22_{18}$ in the data-retention and difference-calculation unit $2_{01}$ outputs each of nineteen pieces of difference data $D20_{L3}$ to $D02_{L3}$ which represents the difference between two pieces of pixel data separated from each other by each of twenty to two pixels in a pixel data alignment of the line L3 shown in FIG. 2C. As well as the data-retention and difference-calculation unit $2_{00}$, each of the difference data generating portions $22_{00}$ to $22_{18}$ in the data-retention and difference-calculation unit $2_{02}$ outputs each of nineteen pieces of difference data $D20_{L5}$ to $D02_{L5}$ which represents the difference between two pieces of pixel data separated from each other by each of twenty to two pixels in a pixel data alignment of the line L5 shown in FIG. 2C.

In the example shown in FIG. 2, for example, three pieces of difference data $D20_{L1}$, $D20_{L3}$ and $D20_{L5}$ between the pixel data P20 and the pixel data P00 and three pieces of difference data $D02_{L1}$, $D02_{L3}$ and $D02_{L5}$ between the pixel data P20 and the pixel data P18 have relatively large values, and three pieces of difference data $D08_{L1}$, $D08_{L3}$ and $D08_{L5}$ between the pixel data P20 and the pixel data P12 have relatively small values. For example, if all pixels of black have the same luminance (luminance "0") and all pixels of white have the same luminance, difference data between pixels of black and difference data between pixels of white have "0".

Figure 4:
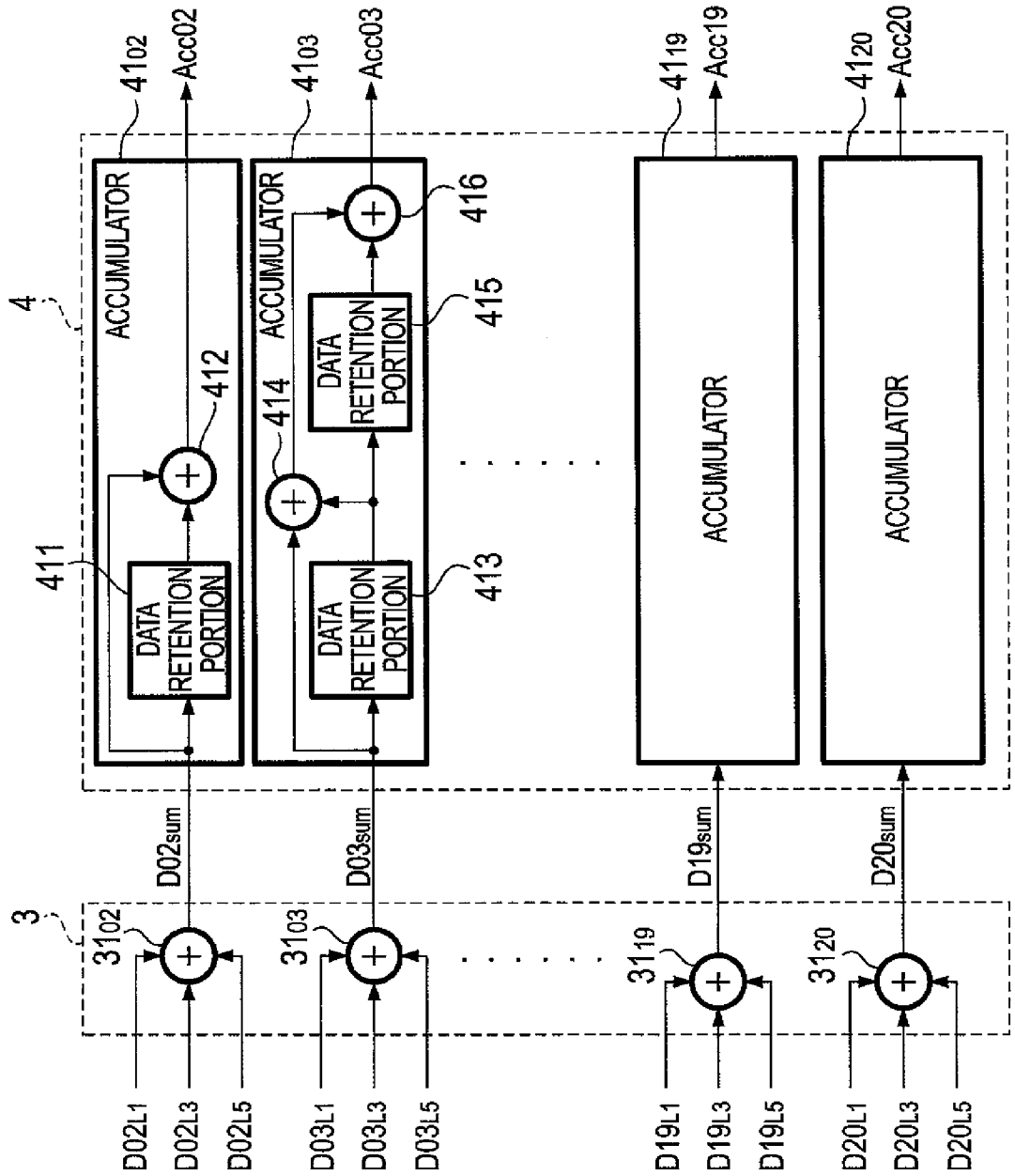
FIG. 4 is a block diagram that illustrates a concrete configuration example of an adding unit 3 and a horizontal direction accumulating unit 4 in FIG. 1

Returning to FIG. 1, the nineteen pieces of difference data $D20_{L1}$ to $D02_{L1}$ output from the data-retention and difference-calculation unit $2_{00}$, the nineteen pieces of difference data $D20_{L3}$ to $D02_{L3}$ output from the data-retention and difference-calculation unit $2_{01}$ and the nineteen pieces of difference data $D20_{L5}$ to $D02_{L5}$ output from the data-retention and difference-calculation unit $2_{02}$ are input into an adding unit 3. As shown in FIG. 4, the adding unit 3 includes adders $31_{02}$ to $31_{20}$. The adder $31_{02}$ adds the difference data $D02_{L1}$, the difference data $D02_{L3}$ and the difference data $D02_{L5}$ and outputs added data $D02_{sum}$. As well, each of the adders $31_{03}$ to $31_{20}$ adds each of three pieces of difference data D03L1, D03L3 and D03L5 to three pieces of difference data D20L1, D20L3 and D20L5 and outputs each of eighteen pieces of added data $D03_{sum}$ to $D20_{sum}$.

Thus, the adding unit 3 adds three pieces of difference data each between two pieces of pixel data separated from each other by each of twenty to two pixels in the line L1, L3 or L5 shown in FIG. 2C by each pixel interval. Since the adding unit 3 adds three pieces of difference data in the lines by each pixel interval, when a video signal includes a repetitive object such as the striped pattern of FIG. 2, the nineteen pieces of added data $D20_{sum}$ to $D02_{sum}$ include data having large values and data having small values.

Again, returning to FIG. 1, the nineteen pieces of added data D20sum to D02sum output from the adding unit 3 are input into a horizontal direction accumulating unit 4. As shown in FIG. 4, the horizontal direction accumulating unit 4 includes accumulators $41_{02}$ to $41_{20}$. The accumulator $41_{02}$ includes a data retention portion 411 that retains the added data $D02_{sum}$ for a time corresponding to two pixels (two clocks) in FIGS. 2A and 2B and outputs it, and an adder 412 that adds the added data $D02_{sum}$ and an output from the data retention portion 411. Namely, the accumulator $41_{02}$ outputs a horizontal accumulated value Acc02 generated by accumulating added data $D02_{sum}$ output from the adding unit 3 at the present time and added data $D02_{sum}$ at a past time by one pixel in FIG. 2C.

The accumulator $41_{03}$ includes data retention portions 413 and 415 each of which retains the added data $D03_{sum}$ for a time corresponding to two pixels (two clocks) in FIGS. 2A and 2B and outputs it, an adder 414 that adds the added data $D03_{sum}$ and an output from the data retention portion 413, and an adder 416 that adds an output from the adder 414 and an output from the data retention portion 415. Namely, the accumulator $41_{03}$ outputs a horizontal accumulated value Acc03 generated by accumulating added data $D03_{sum}$ output from the adding unit 3 at the present time, added data $D03_{sum}$ at a past time by one pixel in FIG. 2C, and added data $D03_{sum}$ at a past time by two pixels in FIG. 2C. An accumulator 41 to which an index is not assigned is one in which any of the integrators $41_{02}$ to $41_{20}$ is not identified.

If added data from the adding unit 3 to be input into the accumulator 41 is generated by adding three pieces of difference data between two pieces of pixel data separated from each other by "k" pixels in the lines L1, L3 and L5 shown in FIG. 2C, the accumulator 41 outputs a horizontal accumulated value generated by accumulating "k−1" pieces of added data from the present time to a past time by "k−1" pixels. For example, the accumulator $41_{19}$ outputs a horizontal accumulated value Acc19 generated by accumulating nineteen pieces of added data $D19_{sum}$, wherein the nineteen pieces of added data $D19_{sum}$ are added data $D19_{sum}$ at the present time output from the adding unit 3 and eighteen pieces of added data $D19_{sum}$ from a past time by one pixel to a past time by eighteen pixels. Also, the accumulator $41_{20}$ outputs a horizontal accumulated value Acc20 generated by accumulating twenty pieces of added data $D20_{sum}$, wherein the twenty pieces of added data $D20_{sum}$ are added data D20, at the present time output from the adding unit 3 and nineteen pieces of added data D20sum from a past time by one pixel to a past time by nineteen pixels.

Here, a concrete numerical example of horizontal accumulated values Acc20 to Acc02 will be described with reference to FIG. 5. In order to simplify calculation, it is assumed that a difference between data for a pixel of black and data for a pixel of white has a value "10". In a pixel data alignment shown in FIG. 2C, for example, difference data $D02_{L1}$ has a value "10" and added data $D02_{sum}$ has a value "30". Respective values of added data $D20_{sum}$ to $D02_{sum}$ at the present time in which pixel data P00 is latest pixel data are shown in FIG. 5(A). At a past time by one pixel in FIG. 2C, twenty-one pieces of pixel data from pixel data P01 to pixel data (not shown) located on the immediate right of the pixel data P20 are processed by the circuits shown in FIGS. 3 and 4 as twenty-one pieces of pixel data P00 to P20. Therefore, respective values of nineteen pieces of added data $D20_{sum}$ to $D02_{sum}$ at the past time by one pixel are shown in FIG. 5(B). As well, respective values of nineteen pieces of added data $D20_{sum}$ to $D02_{sum}$ at a past time by each of two to nineteen pixels are shown in each of FIGS. 5(C) to 5(T).

The horizontal accumulated values Acc20 to Acc02, each of which is generated by accumulating values within a hatching range in FIGS. 5(A) to 5(T) in a vertical direction with respect to respective pieces of added data $D20_{sum}$ to $D02_{sum}$, have values shown in FIG. 5(U). The respective values of the horizontal accumulated values Acc20 to Acc02 are small or large according to a value of "M" in M-pixels width in FIG. 2A. More specifically, since the pixel data alignment in the horizontal direction shown in FIG. 2C is generated by jumping the pixel data alignment in the horizontal direction shown in FIG. 2A by one alignment in series, a horizontal accumulated value Acc to which an index "M/2" is assigned has the smallest value. Sine FIG. 2A illustrates the repetitive object with absolute sixteen pixels width, a horizontal accumulated value Acc08 has "0" shown in FIG. 5(U). It is noted that a horizontal accumulated value Acc16 to which an index (M/2) *2 is assigned has "0" similarly.

Here, since the repetitive object in which the pixel width has a single value in the horizontal direction and the vertical direction is cited as example, the horizontal accumulated value Acc to which the index "M/2" is assigned has "0". Generally, since it is rare that a pixel width has a single value, it is often that it has a value more than "0" in fact. In a case where a repetitive object in which a pixel width does not have a single value has a repetitive pattern in which a certain pixel width is mostly repeated, a horizontal accumulated value Acc corresponding to the pixel width of the repetitive pattern has the smallest value. Therefore, according to the repetitive object detecting device and the repetitive object detecting method having the first configuration example, it is possible to detect whether or not a concerned pixel is located in the repetitive object or detect a pixel width of the repetitive pattern which the repetitive object has, by using the horizontal accumulated values Acc20 to Acc02.

Again returning to FIG. 1, the horizontal accumulated values Acc20 to Acc02 obtained as above are input into a small and large comparing unit 5. Using the input horizontal accumulated values Acc20 to Acc02, the small and large comparing unit 5 detects how many pixels are included in a pixel width of a repetitive pattern which a repetitive object has. Hereinafter, a pixel width is represented based on the pixel data alignment of FIG. 2C and is defined as an N-pixels width (integer N≧2). Namely, the example shown in FIG. 2C represents a repetitive pattern of an eight-pixels width.

A concrete configuration and workings of the small and large comparing unit 5 will be described with reference to FIG. 6. In FIG. 6, the horizontal accumulated value Acc20 having an interval of twenty pixels is input into an adder $51_{20}$ and a comparing portion $52_{2019}$. The adder $51_{20}$ adds the horizontal accumulated value Acc20 and an offset value Ofs and supplies the added value to a comparing portion $52_{2010}$ as an input signal "a". The horizontal accumulated value Acc10 having an interval of ten pixels which is a half of the interval of twenty pixels is input into the comparing portion $52_{2010}$ as an input signal "b". The comparing portion $52_{2010}$ compares the input signal "a" and the input signal "b", and outputs "1" if a<b or "0" if not a<b. It is noted that an index assigned to a comparing portion 52 corresponds to two indexes of two horizontal accumulated values Acc concerned. An index "2010" indicates that the horizontal accumulated value Acc20 and the horizontal accumulated value Acc10 are compared, and an index "2019" indicates that the horizontal accumulated value Acc20 and the horizontal accumulated value Acc19 are compared. Hereinafter, the same is applied to all comparing portions 52.

The horizontal accumulated value Acc20 having the interval of twenty pixels is input into a comparing portion $52_{2019}$ as an input signal "c" and the horizontal accumulated value Acc19 having an interval of nineteen pixels which is smaller than the interval of twenty pixels by one pixel is input into the comparing portion $52_{2019}$ as an input signal "d". The comparing portion $52_{2019}$ compares the input signal "c" and the input signal "d", and outputs "1" if c<d or "0" if not c<d. An AND circuit $53_{20}$ outputs "1" as an output value F20 if both of outputs from the comparing portion $52_{2010}$ and the comparing portion $52_{2019}$ are "1", or outputs "0" as the output value F20 if any of outputs from the comparing portion $52_{2010}$ and the comparing portion $52_{2019}$ is "0".

An adder $51_{19}$ adds the horizontal accumulated value Acc19 having the interval of nineteen pixels and an offset value Ofs and supplies the added value to a comparing portion $52_{1909}$ as an input signal "a". The horizontal accumulated value Acc09 having an interval of nine pixels which is a half of an interval of eighteen pixels generated by subtracting one pixel from nineteen pixels is input into the comparing portion $52_{1909}$ as an input signal "b". The comparing portion $52_{1909}$ compares the input signal "a" and the input signal "b", and outputs "1" if a<b or "0" if not a<b. The horizontal accumulated value Acc19 having the interval of nineteen pixels is input into a comparing portion $52_{1918}$ as an input signal "c" and the horizontal accumulated value Acc18 having an interval of eighteen pixels which is smaller than the interval of nineteen pixels by one pixel is input into a comparing portion $52_{1916}$ as an input signal "d". The comparing portion $52_{1918}$ compares the input signal "c" and the input signal "d", and outputs "1" if c<d or "0" if not c<d. An AND circuit $53_{19}$ outputs "1" as an output value F19 if both of outputs from the comparing portion $52_{1909}$ and the comparing portion $52_{1918}$ are "1", or outputs "0" as the output value F19 if any of outputs from the comparing portion $52_{1909}$ and the comparing portion $52_{1918}$ is "0".

As well, with respect to the horizontal accumulated values Acc18 to Acc05, a comparing portion that compares an input signal "a" which is a value generated by adding an offset value Ofs to a horizontal accumulated value having an interval of N pixels (N is one of 18 to 5) and an input signal "b" which is a horizontal accumulated value having an interval of N/2 pixels if N is an even number or an interval of (N−1)/2 pixels if N is an odd number, and a comparing portion that compares an input signal "c" which is a horizontal accumulated value having the interval of N pixels and an input signal "d" which is a horizontal accumulated value having an interval of (N−1) pixels are provided. Also, an AND circuit that carries out AND operation with respect to outputs from two comparing portions is provided. The respective AND circuits output "1" or "0" as output values F18 to F05.

An adder $51_{04}$ adds the horizontal accumulated value Acc04 having an interval of four pixels and an offset value Ofs and supplies the added value to a comparing portion $52_{0402}$ as an input signal "a". The horizontal accumulated value Acc02 having an interval of two pixels is input into the comparing portion $52_{0402}$ as an input signal "b". The comparing portion $52_{0402}$ compares the input signal "a" and the input signal "b", and outputs "1" if a<b or "0" if not a<b. The horizontal accumulated value Acc04 is input into a comparing portion $52_{0403}$ as an input signal "c" and the horizontal accumulated value Acc03 having an interval of three pixels is input into the comparing portion $52_{0403}$ as an input signal "d". The comparing portion $52_{0403}$ compares the input signal "c" and the input signal "d", and outputs "1" if c<d or "0" if not c<d. An AND circuit $53_{04}$ outputs "1" as an output value F04 if both of outputs from the comparing portion $52_{0402}$ and the comparing portion $52_{0403}$ are "1", or outputs "0" as the output value F04 if any of outputs from the comparing portion $52_{0402}$ and the comparing portion $52_{0403}$ is "0".

In the example of FIG. 6, while the horizontal accumulated value having the interval of (N−1)/2 pixels is defined as the input signal "b" when N of the interval of N pixels (integer N is one of 20 to 4) is an odd number, a horizontal accumulated value having an interval of (N+1)/2 pixels may be defined as the input signal "b". Namely, a comparing portion for comparing the input signal "a" and the input signal "b" compares a value generated by adding an offset value Ofs to a horizontal accumulated value having the interval of N pixels with a horizontal accumulated value having an interval of pixels adjacent to an interval of N/2 pixels.

FIG. 7 illustrates output values of the comparing portions $52_{2010}$ to $52_{0403}$ and the comparing portions $52_{2019}$ to $52_{0403}$ and output values F20 to F04 of the AND circuits $53_{20}$ to $53_{04}$ when the horizontal accumulated values Acc20 to Acc02 are the values shown in FIG. 5(U). If a repetitive object in which a pixel width has a single value is cited, only the output value F08 of the AND circuit $53_{08}$ corresponding to the horizontal accumulated value Acc08 indicating the pixel width of the repetitive pattern is "1" as shown in FIG. 7.

The reason that the offset values Ofs are added to the horizontal accumulated values each having an interval of N-pixels in the respective comparing portions $52_{2010}$, $52_{1909}$, ..., $52_{0402}$ is as follows. As will be noted from FIG. 5(U), a horizontal accumulated value (here, the horizontal accumulated value Acc08) having a pixel width of a repetitive pattern is about the same value as a horizontal accumulated value (here, the horizontal accumulated value Acc16) having a pixel width which is twice the pixel width of the repetitive pattern. The same applies to a case where a horizontal accumulated value having a pixel width which is three or more times the pixel width of the repetitive pattern is included. So, in the first configuration example, the comparing portions $52_{2010}$, $52_{1909}$, ..., $52_{0402}$ compares a value generated by adding a horizontal accumulated value having an interval of N-pixels to an offset value Ofs and a horizontal accumulated value having an interval of pixels adjacent to an interval of N/2-pixels, which avoid a wrong decision that a horizontal integrated value having a pixel width which is multiples of a pixel width of an original repetitive pattern indicates the pixel width of the repetitive pattern.

In FIG. 6, the offset values Ofs may be just the same or set to respective optimal values by the respective adders $51_{20}$ to $51_{04}$. The offset values Ofs may be different by the respective adders $51_{20}$ to $51_{04}$ or a part of the adders $51_{20}$ to $51_{04}$. Since false detection of motion vector tends to occur when a repetitive pattern has a small pixel width, it is preferable to detect a repetitive pattern having a small pixel width as possible. So, in a case where the offset values Ofs are set by the respective adders $51_{20}$ to $51_{04}$, it is preferable to set an offset value Ofs to be large as a pixel width is large and to be small as a pixel width is small.

Further in FIG. 6, the output values F20 to F04 from the AND circuits $53_{20}$ to $53_{04}$ are input into a decision portion 54. The decision portion 54 outputs a decision value F for a pixel width according to the output values F20 to F04 from the AND circuits $53_{20}$ to $53_{04}$. More specifically, in a case where an output value from only one AND circuit 53 is "1", the decision portion 54 outputs a pixel width value corresponding to the one AND circuit. In the example shown in FIG. 7, since only the output value F08 from the AND circuit $53_{08}$ is "1", "8" is output as the decision value F. In a case where an input video signal includes a repetitive object and a pixel width of the repetitive pattern is detected, the decision value F is any one of "4" to "20". The decision value F which is any one of "4" to "20" represents a state where the pixel data P20 which is the reference pixel data is located in the repetitive object and represents a pixel width of the repetitive pattern.

In a case where any of the output values F20 to F04 from the AND circuits $53_{20}$ to $53_{04}$ are "0", this represents a state where a pixel width of a repetitive pattern is not detected. In this case, a value (e.g., "0") which represents a state where a repetitive object is not included is output as the decision value F. In a case of a repetitive object in which a pixel width has a single value, there is a possibility that a plurality of output values among the output values F20 to F04 from the AND circuits $53_{20}$ to $53_{04}$ is "1". In such case, this represents a detection state where the pixel data P20 which is the reference pixel data is located in the repetitive object. In a case where the plurality of output values is "1", an output value having the smallest pixel width may be output as the decision value F representing a pixel width.

Thus, in the small and large comparing unit 5, reference pixel data in the data-retention and difference-calculation unit $2_{00}$ to $2_{02}$ is concerned pixel data in repetitive object detection. Every time when pixel data is input into the repetitive object detecting device of the first configuration example, reference pixel data is updated and decision values F are output by respective pieces of reference pixel data.

As will be noted from the above, in the first configuration example, since there is a comparing portion that compares an input signal "a" which is generated by adding an offset value Ofs to a horizontal accumulated value having an interval of N pixels and an input signal "b" which is a horizontal accumulated value having an interval of pixels adjacent to an interval of N/2 pixels, even if difference data or added data having an interval of one pixel based on a difference between the pixel data P20 and the pixel data P19 and a horizontal accumulated value based on the added data are generated, they are not used in the small and large comparing unit 5 of FIG. 6. Therefore, as the above, difference data between the pixel data P20 and the pixel data P19 is not used in FIG. 3.

The small and large comparing unit 5 shown in FIG. 6 as described above is configured to detect whether or not concerned pixel data is located in a repetitive object and accurately detect a pixel width of a repetitive pattern in the extreme. A concrete configuration of the small and large comparing unit 5 is not limited to the example shown in FIG. 6. While there are provided both of the comparing portions $52_{2010}$ to $52_{0402}$ which are a first comparing portion and the comparing portions $52_{2019}$ to $52_{0403}$ which are a second comparing portion and there are the AND circuits $53_{20}$ to $53_{04}$ carrying out the AND operation with respect to the both, there may be provided a configuration that supplies only outputs from the comparing portions $52_{2010}$ to $52_{0402}$ to the decision portion 54 and then detects whether or not concerned pixel data is located in a repetitive object and detects a pixel width of a repetitive pattern.

In a case where there are provided only the comparing portions $52_{2010}$ to $52_{0402}$, since detection accuracy is slightly deteriorates, a state where a plurality of outputs among outputs from the comparing portions $52_{2010}$ to $52_{0402}$ has a value "1" is easy to occur. If at least one of the outputs from the comparing portions $52_{2010}$ to $52_{0402}$ has a value "1", the decision portion 54 may output a decision value F which represents a state where concerned pixel data is located in a repetitive object. In a case where a plurality of outputs has a value "1", since there is a high possibility that an output value having the smallest pixel width is a pixel width value, the output value having the smallest pixel width may be output as a decision value F representing a pixel width as well as the above.

Further, while the respective comparing portions $52_{2019}$ to $52_{0403}$ compare an input signal "c" which is a horizontal accumulated value having an interval of N pixels and an input signal "d" which is a horizontal accumulated value having an interval of N−1 pixels in FIG. 6, respective comparing portions may compare an input signal "c" which is a horizontal accumulated value having an interval of N pixels and an input signal "d" which is a horizontal accumulated value having an interval of N+1 pixels under a state where the comparing portion $52_{2019}$ is eliminated. Thus, an inner configuration of the small and large comparing unit 5 is variously proposed. It only needs to determine whether or not concerned pixel data (reference pixel data) is located in a repetitive object including a certain repetitive pattern by comparing the horizontal accumulated values Acc02 to Acc20 for respective separated pixel numbers calculated in the horizontal direction accumulating unit 4.

By the process until the small and large comparing unit 5 described the above, it is possible to determine whether or not an input video signal includes a repetitive object, and obtain a pixel width of a repetitive pattern if the repetitive object is included. In the first configuration example, in order to further reduce false detection, as shown in FIG. 1, a horizontal direction repetitive decision unit 6 is provided at a stage subsequent to the small and large comparing unit 5. While it is not necessary to provide the horizontal direction repetitive decision unit 6, it is preferable to provide it to reduce false detection. A concrete configuration and workings of the horizontal direction repetitive decision unit 6 will be described with reference to FIG. 8.

As illustrated in FIG. 8, the horizontal direction repetitive decision unit 6 includes twenty data retention portions 61 that are data retention portions $61_{10n}$ to $61_{01n}$, $61_{00}$, $61_{01p}$ to $61_{09p}$ each of which retains an input decision value F for a time corresponding to two pixels (two clocks) in FIG. 2A and outputs it. A decision value F input into the data retention portion $61_{10n}$ is defined as F10n. Decision values F input into respective data retention portions 61 that are the data retention portions $61_{09n}$ to $61_{01n}$ are defined as F09n to F01n. The decision value F09n to F01n are generated by sequentially delaying the decision value F10n input into the data retention portion $61_{10n}$ for a time corresponding to one pixel in FIG. 2C.

A decision value F input into the data retention portion $61_{00}$ is defined as F00. The decision value F00 is a decision value F obtained at a past time by ten pixels in FIG. 2C with respect to the decision value F10n input into the data retention portion $61_{10n}$. In the horizontal direction repetitive decision unit 6, the decision value F00 input into the data retention portion $61_{00}$ is defined as a decision value F for concerned pixel data. The decision values F10n to F01n are future decision values F with respect to the decision value F00. Decision values F input into respective data retention portions 61 that are the data retention portions $61_{01p}$ to $61_{09p}$ are defined as F01p to F09p. A decision value F output from the data retention portion $61_{09p}$ is defined as F10p. The decision values F01p to F10p are past decision values F with respect to the decision value F00.

The decision value F00 of concerned pixel data, the decision values F10n to F01n at future times by one to ten pixels in FIG. 2C with respect to the decision value F00, and the decision values F01p to F10p at past times by one to ten pixels in FIG. 2C with respect to the decision value F00 are input into a comparing decision portion 62. The comparing decision portion 62 compares three decision values, which are a decision value F00 representing an N-pixels width, a decision value at a future time by N/2 pixels with respect to the decision value F00, and a decision value at a past time by N/2 pixels with respect to the decision value F00, and finally decides that a pixel width of a repetitive pattern is the N-pixels width based on the comparison result. If N is an odd number, decision values at a future time and a past time by (N−1)/2 or (N+1)/2 pixels with respect to the decision value F00 may be used instead of decision values at a future time and a past time by N/2 pixels with respect to the decision value F00, as well as the case of FIG. 6. Namely, the decision value F00 and decision values at times near to the future time and the past time by N/2 pixels with respect to the decision value F00 may be used. To simplify an explanation, the case where the decision values at the future time and the past time by N/2 pixels are used will be described below.

For example, in the case where the decision value F00 is eight as shown in FIG. 2, the comparing decision portion 62 decides a pixel width of a repetitive pattern using the decision value F00, the decision value F04n at a future time by four pixels from the data retention portion $61_{05n}$, and the decision value F04p at a past time by four pixels from the data retention portion $61_{03p}$.

In general, a repetitive object does not instantaneously appear at a time corresponding to a concerned pixel, but instead continuously appear during a certain period around the time corresponding to the concerned pixel. Therefore, if an N-pixels width appears at a time corresponding to a concerned pixel, the N-pixels width or a pixel width near the N-pixels width will appear at a future time by N/2 pixels and a past time by N/2 pixels. As shown in FIG. 2, in the case where a repetitive object is an object in which the pixel width has a single value, if the decision value F00 of the concerned pixel is eight, the decision values F04n and F04p at the future time by four pixels and the past time by four pixels are also eight. Actually, since there are many cases where a pixel width does not have a single value, even if the decision value F00 of the concerned pixel is eight, there is a possibility that the decision values F04n and F04p vary within a margin of error such as seven or nine.

In view of the above, if three decision values, which are the decision value F00 of the concerned pixel and the decision values at the future time by N/2 pixels and the past time by N/2 pixels selected based on the N-pixel width represented by the decision value F00, are within a predetermined range, the comparing decision portion 62 finally decides that a pixel width of the repetitive pattern is a value represented by the decision value F00. Then, the decision value F00 representing a pixel width is output as a detection signal Sdet of the repetitive object. On the other hand, if three decision values are not within the predetermined range, the comparing decision portion 62 decides that a repetitive object is not included. Then, a value (e.g., "0") representing that a repetitive object is not included is output as the detection signal Sdet. If the decision value F from the small and large comparing unit 5 is zero, the horizontal direction repetitive decision unit 6 outputs "0".

As a permissible amount for deviation from the decision value F00 increases, a frequency for decision that a repetitive pattern is included increases. Namely, even if a pattern in which a pixel width does not have a single value is included, it is easy to decide that a repetitive pattern is included. As the permissible amount for deviation decreases, the frequency for decision that a repetitive pattern is included decreases. Namely, even if a pattern in which a pixel width has several values is included, it is difficult to decide that a repetitive pattern is included. The permissible amount for deviation from the decision value F00 may be adequately set according to a decision which pattern is a repetitive pattern. For example, if the permissible amount for deviation is set to ±2, a decision whether or not a repetitive object is included is carried out according to a decision whether or not the decision values at a future time by N/2 pixels and a past time by N/2 pixels are within ±2 from the decision value F00 of the concerned pixel.

In the first configuration example, while three decision values, which are a decision value F00 representing an N-pixels width and decision values at a future time by N/2 pixels and at a past time by N/2 pixels with respect to the decision value F00, are used, these decision values are not limited to them. Three decision values may be a decision value F00 and decision values at a future time by a certain number of pixels and at a past time by a certain number of pixels. It is preferable to use the decision values at a future time by N/2 pixels and at a past time by N/2 pixels. This is due to the following reason. As indicated by the example of FIG. 2C, if a concerned pixel is one of pixels of black, the decision values at a future time by N/2 pixels and at a past time by N/2 pixels are decision values of concerned pixels which are pixels of white. If a concerned pixel is one of pixels of white, the decision values at a future time by N/2 pixels and at a past time by N/2 pixels are decision values of concerned pixels which are pixels of black. Therefore, if the decision values at a future time by N/2 pixels and at a past time by N/2 pixels are used, it is possible to decide whether or not there is a repetitive object and a pixel width included in a repetitive pattern, using both of two kinds of pixels (two kinds of luminance values or two kinds of colors) in the repetitive pattern. As a result, it is possible to greatly reduce false detection.

In the first configuration example, while the comparing decision portion 62 decides whether or not there is a repetitive object and a pixel width included in a repetitive pattern using three decision values, it may decide them using two decision values which are the decision value F00 of concerned pixel and the decision value at a future time by N/2 pixels or two decision values which are the decision value F00 of concerned pixel and the decision value at a past time by N/2 pixels. Also, the comparing decision portion 62 may be configured to switch three modes which are a first mode for carrying out decision using three decision values which are the decision value F00 of concerned pixel and the decision values at a future time by N/2 pixels and at a past time by N/2 pixels, a second mode for carrying out decision using two decision values which are the decision value F00 of concerned pixel and the decision value at a future time by N/2 pixels, and a third mode for carrying out decision using two decision values which are the decision value F00 of concerned pixel and the decision value at a past time by N/2 pixels. In addition to the first to third modes, a fourth mode for carrying out decision using only the decision value F00 of concerned pixel is added, and the comparing decision portion 62 may configured to switch four modes. It is noted that the fourth mode is equivalent to a configuration in which the horizontal direction repetitive decision unit 6 is omitted.

Thus, the configuration in which three or four modes are switched can vary degree of decision of a repetitive pattern and it is easy to select an optimal state, which are preferable. In a case of switching modes, a control signal for switching from a control portion (not shown) may be input into the comparing decision portion 62.

In the first configuration example, while detection whether or not an input video signal includes a repetitive object is carried out and then a pixel width of a repetitive pattern is detected if the video signal includes the repetitive object, only the detection whether or not an input video signal includes a repetitive object may be carried out. In this case, when the comparing decision portion 62 in FIG. 8 decides that a repetitive object is included, even if an N-pixels width which a decision value F00 represents has any value, it may output only "1" as a detection signal Sdet, for example. If the detection signal Sdet output from the horizontal direction repetitive decision unit 6 is "1", it is a state where the decision that a concerned pixel is within a repetitive object is carried out. If the detection signal Sdet is "0", it is a state where the decision that a concerned pixel is out of a repetitive object is carried out.

In a case where decision whether or not an input video signal includes a repetitive object is carried out under the configuration in which the horizontal direction repetitive decision unit 6 is omitted, if a decision value of a pixel width obtained based on the outputs values F20 to F04 from the AND circuits $53_{20}$ to $53_{04}$ has any one of "20" to "4", the decision portion 54 may output "1" as a decision value F, for example. If an output from the small and large comparing unit 5 (decision portion 54) is "1", it is a state where the decision that a concerned pixel is within a repetitive object is carried out. If an output from the small and large comparing unit 5 (decision portion 54) is "0", it is a state where the decision that a concerned pixel is out of a repetitive object is carried out.

A repetitive object detecting method to be carried out by the repetitive object detecting device of the first configuration example as described above will be described again with reference to FIG. 9. In FIG. 9, when the processing of repetitive object detecting method starts, in step S101, plural pieces of pixel data, which are within a certain range in one line of a video signal, are extracted over plural lines. The step S101 is carried out by the two lines memories $1_{00}$ and $1_{01}$ and the data-retention and difference-calculation units $2_{00}$ to $2_{02}$. In step S102, with respect to the respective plural lines, pixel data located in an end of the plural pieces of pixel data is defined as reference pixel data and respective differences each between the reference pixel data and pixel data which is one of pixel data separated from the reference pixel data by two pixels to pixel data separated from the reference pixel by a maximum number of pixels are calculated, which generates plural pieces of difference data for respective separated pixel numbers k. The step S102 is carried out by the data-retention and difference-calculation units $2_{00}$ to $2_{02}$.

In step S103, plural pieces of difference data of the plural lines are added by each separated pixel number k, which generates added data for each separated pixel number k. The step S103 is carried out by the adding unit 3. In step S104, the added data of each separated pixel number k is sequentially delayed for a time corresponding to one pixel within a range from a time corresponding to one pixel to a time corresponding to the number of pixels generated by subtracting one from the separated pixel number "K", and then added data before delay and all pieces of added data after delay are added by each separated pixel number k. Thereby, a horizontal accumulated value is generated by each separated pixel number k by accumulating plural pieces of added data in a horizontal direction by each separated pixel number k. The step S104 is carried out by the horizontal direction accumulating unit 4. In step S105, decision whether or not the reference pixel data is located in a repetitive object including a certain repetitive pattern is carried out by carrying out small and large comparison with respect to the horizontal accumulated value by each separated pixel number k. At this time, in a case where decision that the reference pixel data is located in a repetitive object is carried out, a value of the number of pixels representing the number of pixels in one cycle of a repetitive pattern may be output. The step S105 is carried out by the small and large comparing unit 5.

In order to reduce false detection, it is preferable to carry out the following steps S106 and S107. In step S106, a value of the number of pixels is sequentially delayed by a time corresponding one pixel of plural pieces of pixel data. Then, in step S107, any one of the delayed values of the number of pixels is defined as a first value of the number of pixels of concerned pixel data, and a second value of the number of pixels at either a past time or a future time with respect to the first value of the number of pixels is compared with the first value of the number of pixels. Based on the comparison result, the final decision whether or not the concerned pixel data is located in a repetitive object is carried out and then finished. It is noted that the concerned pixel data corresponds to one generated by delaying the reference pixel data. The steps S106 and S107 are carried out by the horizontal direction repetitive decision unit 6.

Figure 10:
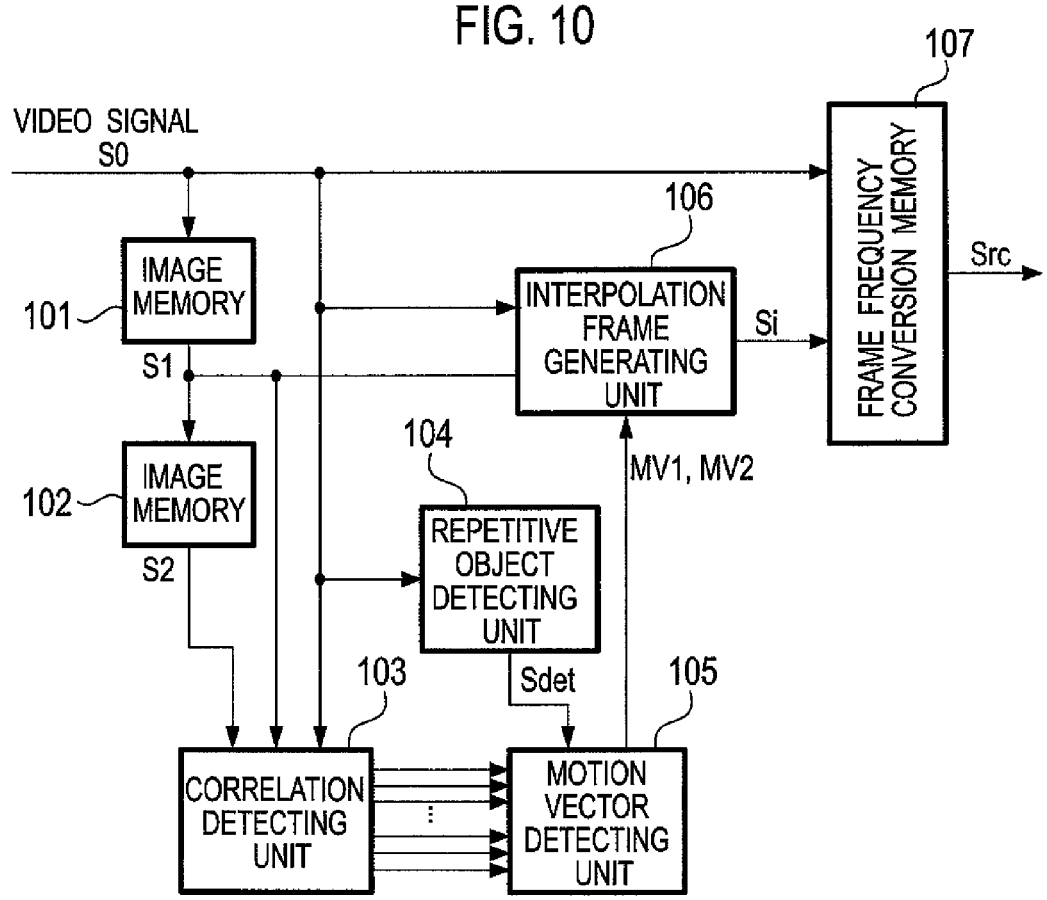
FIG. 10 is a block diagram that illustrates an example of a configuration in which the repetitive object detecting device is employed in a frame frequency conversion apparatus.

Next, one configuration example in which the detection result of repetitive object obtained by the repetitive object detection device in the first configuration example is used at a time of a motion vector detection will be described with reference to FIG. 10. FIG. 10 illustrates an example in which the repetitive object detection device in the first configuration example is employed in a frame frequency conversion apparatus that doubles a frame frequency of a video signal.

In FIG. 10, a video signal S0 is input into an image memory 101, a correlation detecting unit 103, a repetitive object detecting unit 104, an interpolation frame generating unit 106 and a frame frequency conversion memory 107. The repetitive object detecting unit 104 corresponds to the repetitive object detecting device in the first configuration example shown in FIG. 1. The image memory 101 delays each frame of the input video signal S0 by one frame period and outputs it as a video signal S1. The video signal S1 output from the image memory 101 is input into an image memory 102, the correlation detecting unit 103 and the interpolation frame generating unit 106. The image memory 102 further delays each frame of the input video signal S1 by one frame period and outputs it as a video signal S2. The video signal S2 output from the image memory 102 is input into the correlation detecting unit 103.

Figure 11:
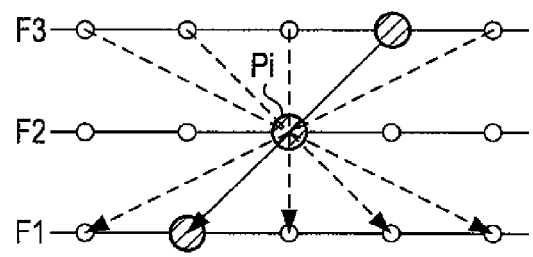
FIG. 11 is a diagram that explains workings at a time when a motion vector is detected.

The correlation detecting unit 103 detects a correlation using a video signal S0 of a current frame, a video signal S1 delayed by one frame and output from the image memory 101, and a video signal S2 delayed by two frames and output from the image memory 102. Workings of the correlation detecting unit 103 will be described with reference to FIG. 11. FIG. 11 illustrates the same line of frames F1, F2 and F3 of a video signal. Time elapses from the frame F3 to the frame F1. The frame F1 corresponds to a frame of a video signal S0, the frame F2 corresponds to a frame of video signal S1, and the frame F3 corresponds to a frame of video signal S2. Here, a pixel Pi of the frame F2 indicated by a circle with hatching is a concerned pixel.

The correlation detecting unit 103 calculates differences each between pixel data of the concerned pixel Pi and each of plural pieces of pixel data in the frames F1 and F3 in plural directions around the concerned pixel Pi of which a motion vector is to be obtained, and detects correlations in the plural directions. Circles with non-hatching represent positions of pixels to be used at a time when the differences are calculated. If circles with hatching represent a trajectory of an object moving in a horizontal direction, a difference value in a direction indicated by a continuous line is the smallest, which means the highest correlation. Here, while only one line is shown for the sake of simplification, the correlation detecting unit 103 calculates differences with respect to plural pieces of pixel data between different lines, and detects correlations. A difference may be calculated by not a pixel unit, but instead a block unit including plural pixels.

Difference values in the plural directions detected by the correlation detecting unit 103 are input into a motion vector detecting unit 105. If concerned pixel data is included in a repetitive object as described the above, the repetitive object detecting unit 104 supplies a detection signal Sdet composed of "1" to the motion vector detecting unit 105. If concerned pixel data is not included in a repetitive object, the repetitive object detecting unit 104 supplies a detection signal Sdet composed of "0" to the motion vector detecting unit 105.

If the detection signal Sdet is "0", the motion vector detecting unit 105 normally outputs to the interpolation frame generating unit 106 a direction in which a difference value is the smallest, as a motion vector MV1. In contrast, if the detection signal Sdet is "1", the motion vector detecting unit 105 changes the motion vector detecting method to calculate a motion vector MV2 because there is a possibility that a motion vector MV1 regarding a direction in which a difference value is the smallest is one by false detection, and then outputs it to the interpolation frame generating unit 106. A concrete configuration and workings of the motion vector detecting unit 105 that changes the motion vector detecting method according to an input detection signal Sdet will be described later. The interpolation frame generating unit 106 generates an interpolation frame Si to be inserted between two adjacent frames in a video signal S0 using video signals S0, S1 and a motion vector MV1 or MV2. The motion vectors MV1, MV2 are collectively called a motion vector MV.

The frame frequency conversion memory 107 memorizes a frame in a video signal S0 and an interpolation frame Si. Then, when reading out a frame in a video signal S0 and an interpolation frame Si, the frame frequency conversion memory 107 doubles the number of frames in the video signal S0 and a frame frequency of the video signal S0 by inserting the interpolation frame Si between two adjacent frames in the video signal S0, and outputs a video signal Src subjected to the frame frequency conversion.

An assembly of the correlation detecting unit 103, the repetitive object detecting unit 104 in the first configuration example and the motion vector detecting unit 105 and workings carried out in the assembly are the motion vector detecting apparatus and the motion vector detecting method according to the first exemplary embodiment.

Figure 12:
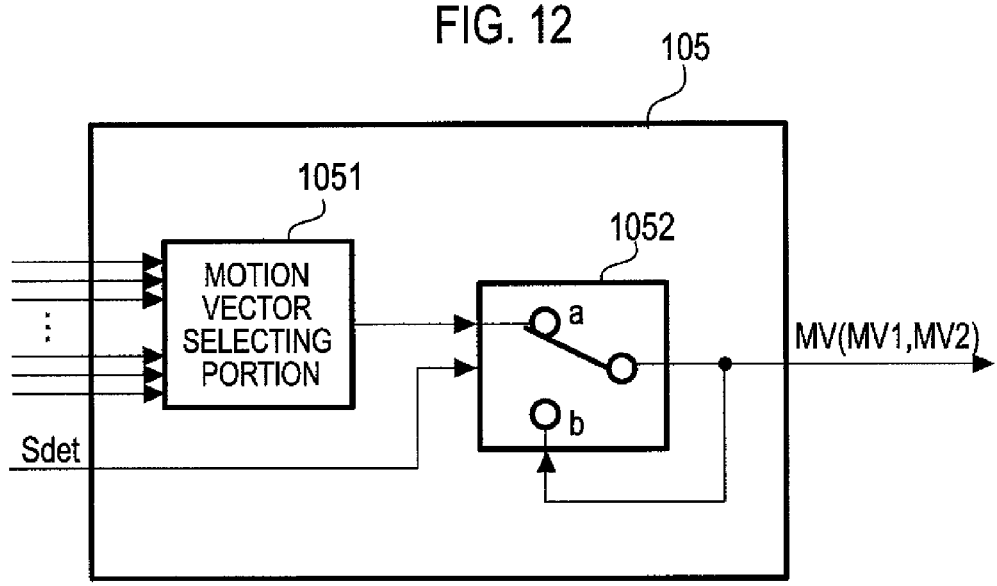
FIG. 12 is a block diagram that illustrates a first concrete example of a motion vector detecting unit 105 in FIG. 10.

Here, a first concrete example and workings of the motion vector detecting unit 105 in FIG. 10 will be described with reference to FIG. 12. In FIG. 12, difference values regarding plural directions detected by the correlation detecting unit 103 in FIG. 10 are input into a motion vector selecting portion 1051. The motion vector selecting portion 1051 outputs a direction having the smallest difference value from among the difference values regarding the input plural directions, as a motion vector MV. It is noted that the motion vector MV is represented as an amount of displacement of a pixel in a horizontal direction and a vertical direction. The motion vector MV is input into a terminal "a" of a switch 1052. A motion vector MV output from the switch 1052 is input into a terminal "b" of the switch 1052. A detection signal Sdet output from the repetitive object detecting unit 104 is input into the switch 1052.

If a detection signal Sdet represents a pixel out of a repetitive object, the switch 1052 switches to the terminal "a" and outputs a motion vector MV output from the motion vector selecting portion 1051. If a detection signal Sdet represents a pixel within a repetitive object, the switch 1052 switches to the terminal "b" and outputs a motion vector MV generated in a past time (by one pixel). Thereby, a motion vector MV obtained with respect to a pixel within a repetitive object in which false detection of a motion vector is easy to occur is not used, and a motion vector MV obtained with respect to a pixel out of a repetitive object in which the false detection is comparatively hard to occur can be used.

In FIG. 12, in a case where it is detected that concerned pixel data from which a motion vector will be detected by the repetitive object detecting unit 104 is within a repetitive object, the switch 1052 works as a motion vector compensating means for rendering a motion vector, which has been detected in a past time with respect to a motion vector newly detected from the concerned pixel data, to be easy to be output as a motion vector. In the concrete example shown in FIG. 12, since the switch 1052 is employed, when concerned pixel data is within a repetitive object, a new motion vector is easy to be replaced with a motion vector detected in a past time. Therefore, this represents a state where a degree that a motion vector detected in a past time is easy to output as a motion vector is maximized.

Figure 13:
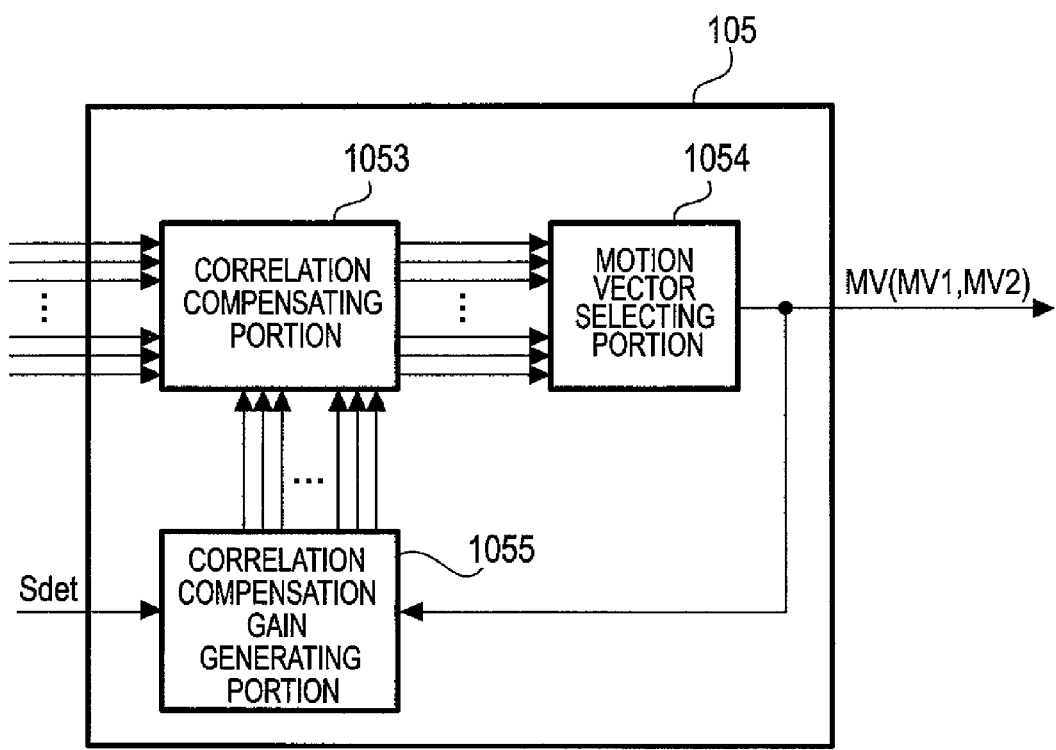
FIG. 13 is a block diagram that illustrates a second concrete example of the motion vector detecting unit 105 in FIG. 10.

Next, a second concrete configuration example and workings of the motion vector detecting unit 105 in FIG. 10 will be described with reference to FIGS. 13 and 14. The second concrete example shown in FIGS. 13 and 14 has a better configuration than the first concrete example shown in FIG. 12. In FIG. 13, difference values regarding plural directions detected by the correlation detecting unit 103 in FIG. 10 are input into a correlation compensating portion 1053. A motion vector MV selected by a motion vector selecting portion 1054 and a detection signal Sdet output from the repetitive object detecting unit 104 are input into a correlation compensation gain generating portion 1055. The correlation compensation gain generating portion 1055 generates plural gains by which respective difference values regarding plural directions will be multiplied, based on the input motion vector MV and the input detection signal Sdet.

The correlation compensating portion 1053 multiplies respective difference values regarding plural directions by the plural gains from the correlation compensation gain generating portion 1055 and supplies them to the motion vector selecting portion 1054. The motion vector selecting portion 1054 outputs a direction having the smallest difference value from among the difference values regarding the input plural directions, as a motion vector MV.

Figure 14:
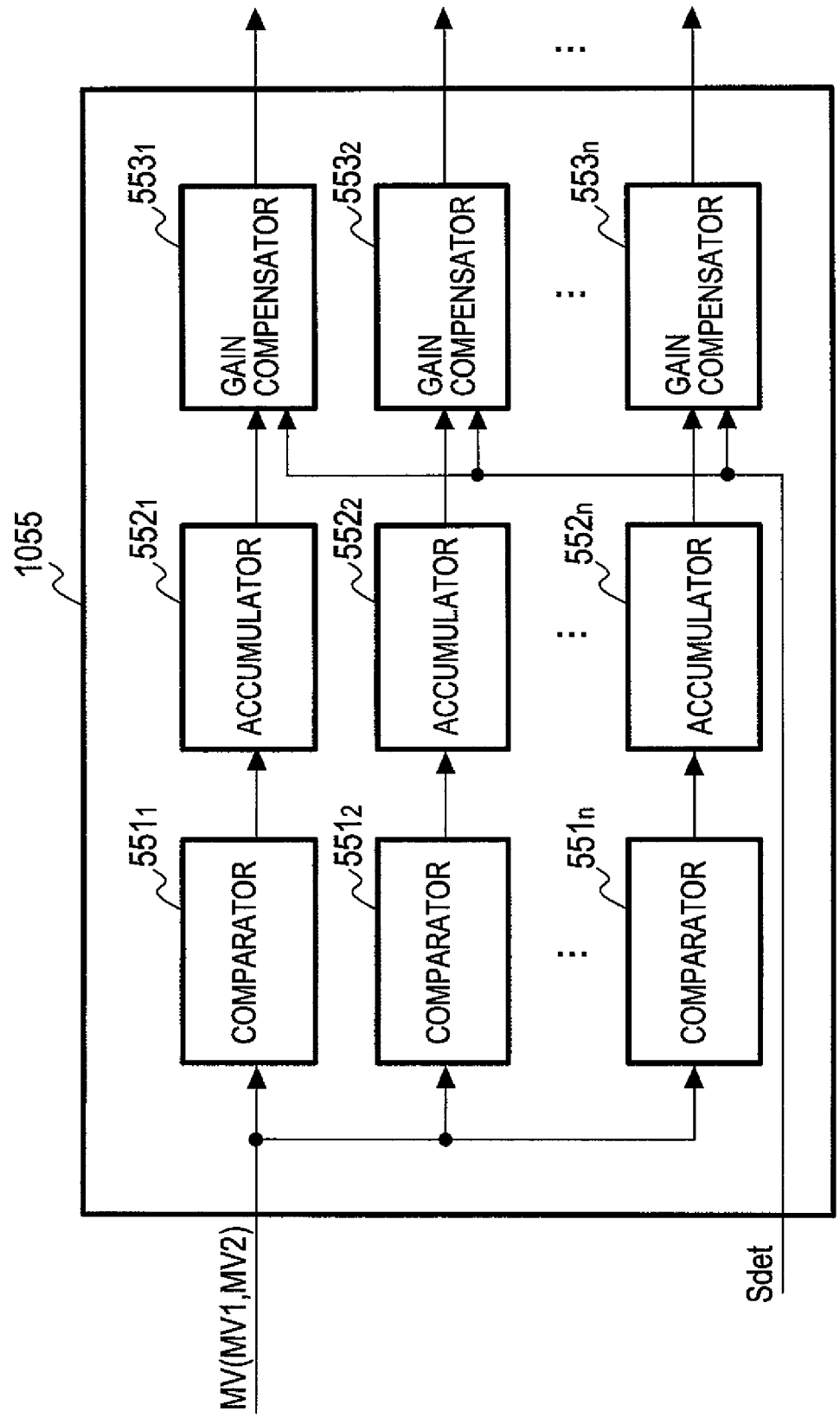
FIG. 14 is a block diagram that illustrates a concrete configuration example of a correlation compensation gain generating portion 1055 in FIG. 13.

FIG. 14 illustrates a concrete configuration of the correlation compensation gain generating portion 1055. As illustrated in FIG. 14, the correlation compensation gain generating portion 1055 includes comparators $551_1$ to $551_n$, accumulators $552_1$ to $552_n$ and gain compensators $553_1$ to $553_n$. A suffix "n" represents the number of plural directions used at the time when a motion vector MV will be detected, and is an arbitrary natural number. In FIG. 14, a motion vector MV is input into the comparators $551_1$ to $551_n$. Motion vectors MV regarding plural directions are individually retained in the respective comparators $551_1$ to $551_n$. The respective comparators $551_1$ to $551_n$ compare the input motion vector MV with each of the retained motion vectors MV regarding plural directions. If both vectors coincide, "1" is output. If both vectors do not coincide, "0" is output.

Comparison results output from the comparators $551_1$ to $551_n$ are input into the accumulators $552_1$ to $552_n$. The respective accumulators $552_1$ to $552_n$ respectively accumulate the input comparison results and output accumulated values. A certain upper limit may be set with respect to an accumulated value. The accumulated values of the comparison results regarding the respective plural directions output from the accumulators $552_1$ to $552_n$ are input into the gain compensators $553_1$ to $553_n$. A detection signal Sdet is also input into the gain compensators $553_1$ to $553_n$.

If the input detection signal Sdet is "1", each of the gain compensators $553_1$ to $553_n$ multiplies an accumulated value by "m" and outputs as a gain an inverse of the accumulated value multiplied by "m". The value "m" is more than one. The accumulated value multiplied by "m" is m times larger than the accumulated value output from each of the accumulators $552_1$ to $552_n$. Since the inverse of accumulated value multiplied by "m" becomes a gain, a gain output from the gain compensator into which the largest accumulated value is input has a considerably small value. In contrast, if the input detection signal Sdet is "0", each of the gain compensators $553_1$ to $553_n$ outputs as a gain an inverses of an accumulated value itself.

The correlation compensating portion 1053 multiplies difference values regarding plural directions output from the correlation detecting unit 103 by gains regarding plural directions output from the correlation compensation gain generating portion 1055 respectively. A value of a gain by which each of the difference values is multiplied is less than one. Therefore, the difference values regarding plural directions output from the correlation detecting unit 103 are compensated such that if a motion vector MV of a pixel being currently obtained coincides with a motion vector having obtained at a past time, it has a small value and if it is a pixel within a repetitive object, it has a small value, and then are output.

By the workings of the correlation compensating portion 1053, there is a possibility that a difference value which does not have the smallest value among the difference values regarding plural directions output from the correlation detecting unit 103 is compensated so as to have a value smaller than a difference value which has the smallest value. The motion vector selecting portion 1054 outputs a direction having the smallest difference value as a motion vector MV based on the compensated difference values output from the correlation compensating portion 1053.

Thus, in the motion vector detecting apparatus and the motion vector detecting method using the motion vector detecting unit 105 of the second concrete example shown in FIGS. 13 and 14, a gain for decreasing a difference value regarding a direction coincident with a direction of motion vector MV having detected at a past time among difference values regarding plural directions is generated and is multiplied by a difference value. In a case where the repetitive object detecting unit 104 detects that concerned pixel data in which a motion vector MV will be detected is within a repetitive object, a gain smaller than one in case where it does not detect that concerned pixel data is within a repetitive object is generated and then multiplied by a difference value. Therefore, a motion vector MV which has the same direction as a motion vector MV having obtained at a past time is easy to be detected as a motion vector. Also, if a concerned pixel is within a repetitive object, a motion vector MV which has the same direction as a motion vector MV having obtained at a long past time is easy to be detected as a motion vector.

In FIG. 13, if the repetitive object detecting unit 104 detects that concerned pixel data in which a motion vector will be detected is within a repetitive object, the correlation compensating portion 1053 and the correlation compensation gain generating portion 1055 work as a motion vector compensating means for rendering a motion vector, which has been detected in a past time with respect to a motion vector newly detected from the concerned pixel data, to be easy to be output as a motion vector.

In FIG. 14, while each of the gain compensators $553_1$ to $553_n$ multiplies an accumulated value by "m" and outputs as a gain an inverse of the accumulated value multiplied by "m" if a detection signal Sdet is "1", it may have the following configurations. If the detection signal Sdet is "1", a value "1" output from any of the comparators $551_1$ to $551_n$ is converted into a certain maximum value, an accumulator connected to the comparator which has output the value "1" is set to non-working and inputs the certain maximum value into a gain compensator. The gain compensator sets an inverse of the certain maximum value as a gain. Workings of the other comparators which have output values "0", accumulators connected to the other comparators which have output the values "0", and gain compensators connected to the accumulators are the same as them in FIG. 14.

Since the interpolation frame generating unit 106 in FIG. 10 generates an interpolation frame Si using a motion vector MV detected by the above, it is possible to generate an interpolation frame Si in which false interpolation is reduced. In this exemplary embodiment, while an object to be compared with a motion vector MV of a pixel being currently obtained is a motion vector MV having obtained before one pixel in the same frame, it is not limited to this. The object may be a motion vector MV at a past time by plural pixels, one or more blocks, one or more lines, or one or more frames.

Here, while the repetitive object detecting device of the first configuration example and the motion vector detecting apparatus of the first exemplary embodiment are employed in the frame frequency conversion apparatus that doubles a frame frequency of a video signal, they may be employed in a frame frequency conversion apparatus increases a frame frequency of a video signal three or more times or an I/P conversion apparatus.

Second Exemplary Embodiment

Figure 15:
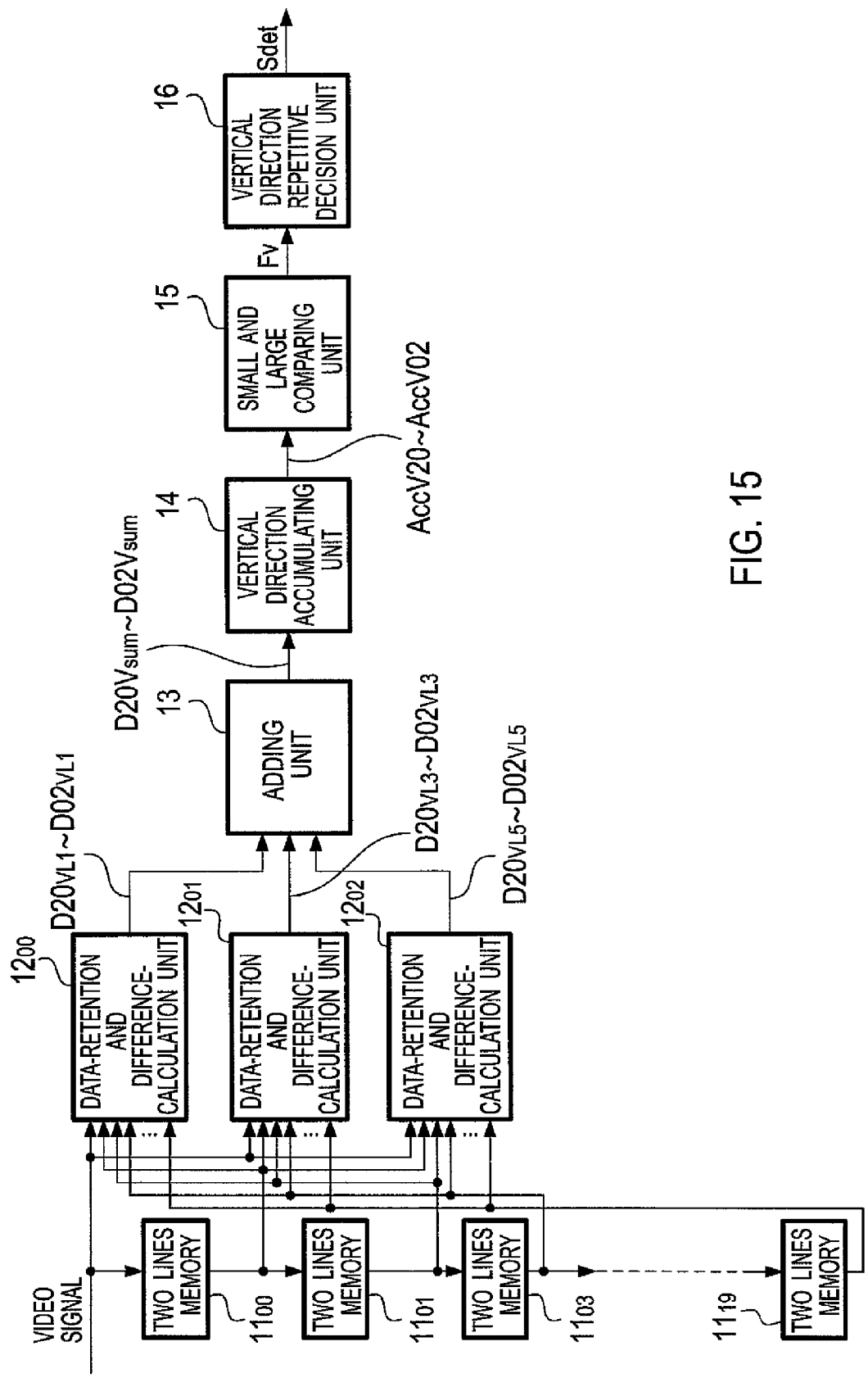
FIG. 15 is a block diagram that illustrates a whole configuration example of a repetitive object detecting device according to a second exemplary embodiment of the present invention.

Next, a repetitive object detecting device of a second configuration example capable of detecting a repetitive object having a repetitive pattern in which pixel data representing a certain gray level or color is repeated in a vertical direction will be described. FIG. 15 is a block diagram illustrates a whole configuration of the repetitive object detecting device of the second configuration example of the present invention. In the second configuration example illustrated in FIG. 15, the description of the same workings as the first configuration example is omitted.

In FIG. 15, a video signal is input into two lines memory $11_{00}$ and a data-retention and difference-calculation unit $12_{00}$. As one example, as shown in FIG. 16A, the input video signal is a luminance signal with a striped pattern in which eight lines, each in which plural pixels of black indicated by circles with hatching are continuously aligned in a horizontal direction, are continuously aligned in a vertical direction, eight lines, each in which plural pixels of white indicated by circles with non-hatching are continuously aligned in the horizontal direction, are continuously aligned in the vertical direction, and eight lines regarding black and eight lines regarding white are alternately repeated in the vertical direction.

Figure 16A:
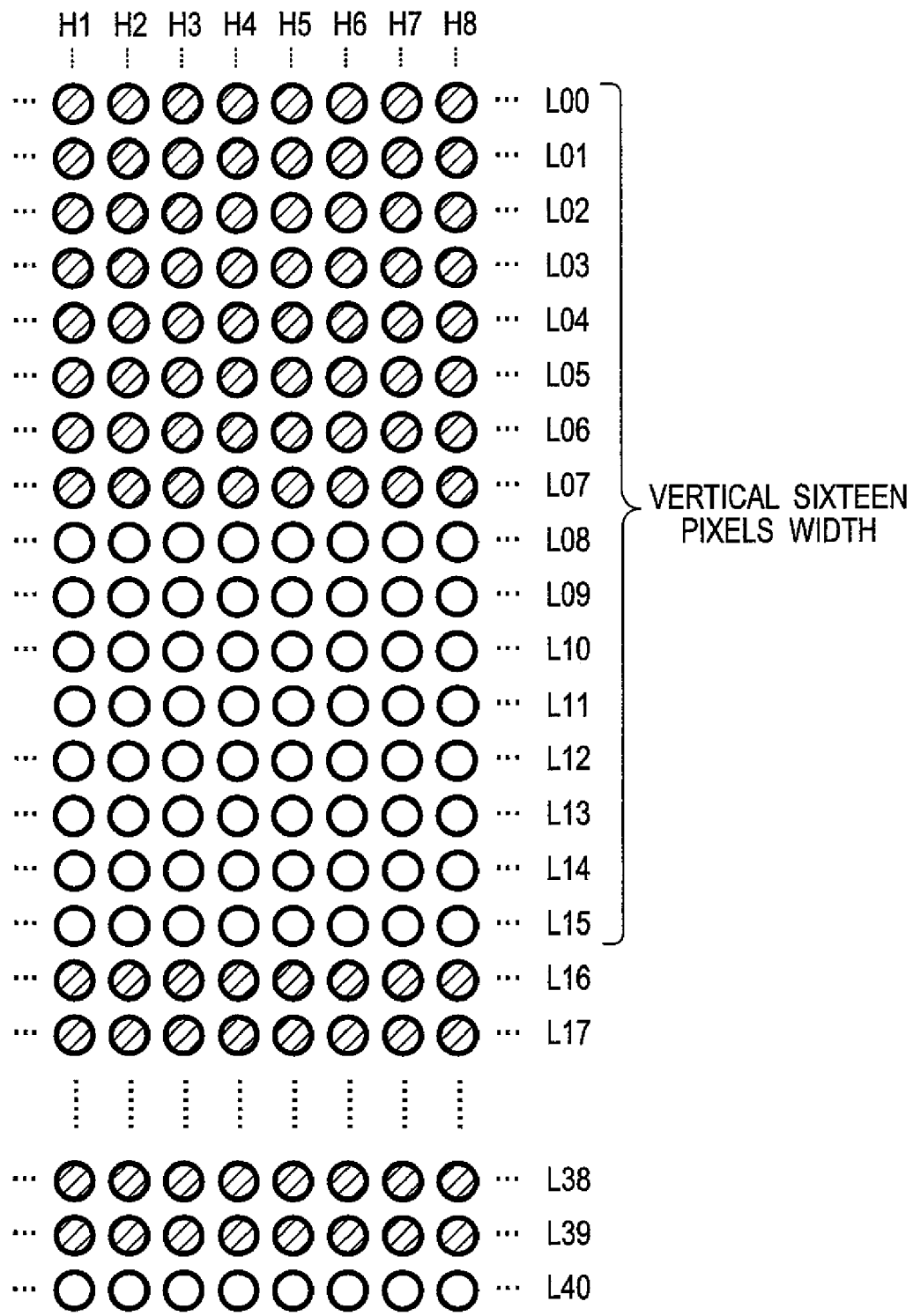
FIG. 16A is a diagram that illustrates an example of pixel data arrangement of a repetitive object in a vertical direction.

In FIG. 16A, forty-one lines L00 to L40 are partly omitted. A cycle of repetitive pattern in the vertical direction is called M-pixels width (integer M≧2). The example illustrated in FIG. 16A uses the repetitive pattern that includes a sixteen-pixels width in the vertical direction. A pixel width is defined as the number of pixels included in one cycle of repetitive pattern in the vertical direction.

The two lines memory $11_{00}$ delays pixel data of a luminance signal input sequentially by two lines. In this exemplary embodiment, two lines memories $11_{01}$ to $11_{19}$ are arranged in cascade connection at a stage subsequent to the two lines memory $11_{00}$. The respective two lines memories $11_{01}$ to $11_{19}$ delay input pixel data by two lines. Twenty-one pieces of pixel data are input into respective data-retention and difference-calculation units $12_{00}$ to $12_{02}$ as a set of pixel data of an input video signal and twenty pieces of pixel data respectively delayed by the two lines memories $11_{00}$ to $11_{19}$.

Figure 16B:
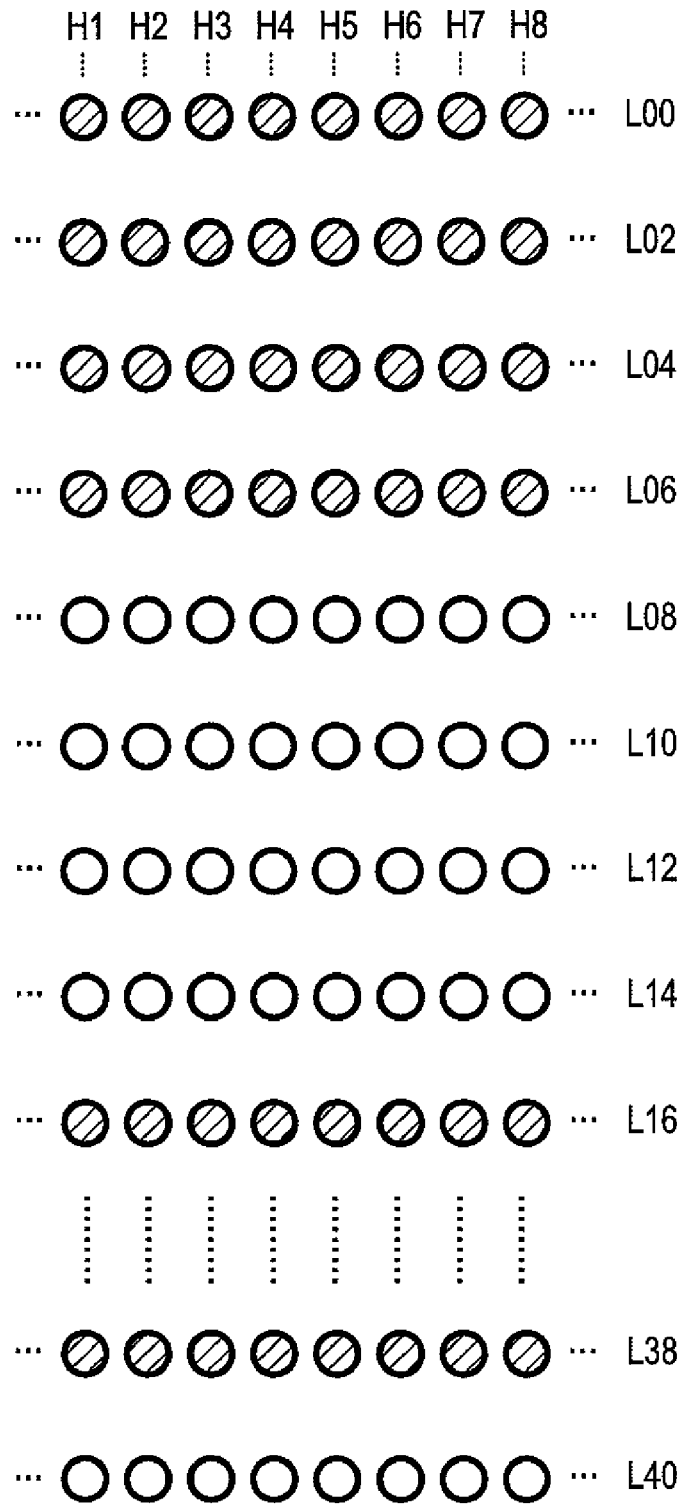
FIG. 16B is a diagram that illustrates an example of pixel data arrangement of a repetitive object in a vertical direction.

For example, if pixel data to be input into the two lines memory $11_{00}$ and the data-retention and difference-calculation units $12_{00}$ to $12_{02}$ is one at a horizontal position H1 in a line L00 in FIG. 16A, twenty-one pieces of pixel data at horizontal positions H1 in lines L00, L02, . . . L38 and L40 in FIG. 16B are input into the data-retention and difference-calculation units $12_{00}$ to $12_{02}$. As well as the first exemplary embodiment, instead of the two lines memories $11_{00}$ to $11_{19}$, using a line memory that delays pixel data by one line, input pixel data may be substantially delayed by two lines by updating read-and-write with respect to the line memory once every two lines. While pixel data is extracted by jumping one line in the vertical direction, it may be extracted from consecutive lines.

The data-retention and difference-calculation unit $12_{01}$ includes a data retention portion that retains respective pieces of pixel data at the horizontal positions H1 in the lines L00, L02, . . . L38 and L40 in FIG. 16B for a time corresponding to two pixels (two clocks) and outputs them. Therefore, the data-retention and difference-calculation unit $12_{01}$ retains respective pieces of pixel data at horizontal positions H3 in the lines L00, L02, . . . L38 and L40 in FIG. 16B. The data-retention and difference-calculation unit $12_{02}$ includes a data retention portion that retains respective pieces of pixel data at the horizontal positions H1 in the lines L00, L02, . . . L38 and L40 in FIG. 16B for a time corresponding to four pixels (four clocks) and outputs them. Therefore, the data-retention and difference-calculation unit $12_{02}$ retains respective pieces of pixel data at horizontal positions H5 in the lines L00, L02, . . . L38 and L40 in FIG. 16B.

Figure 16C:
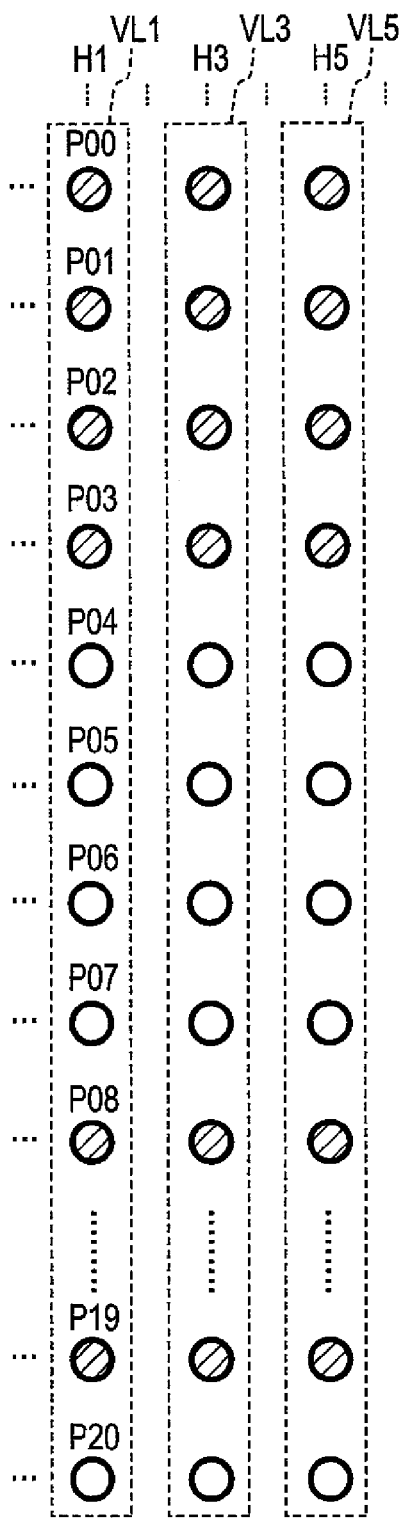
FIG. 16C is a diagram that illustrates an example of pixel data arrangement of a repetitive object in a vertical direction.

As shown in FIG. 16C, twenty-one pieces of pixel data at each of the horizontal positions H1, H3 and H5 in the lines L00, L02, . . . L38 and L40 are called P00 to P20. The twenty-one pieces of pixel data P00 to P20 surrounded by a dashed line at the horizontal position H1, H3 or H5 are called a vertical line VL1, VL3 or VL5. The data-retention and difference-calculation unit $12_{00}$ calculates a difference using twenty-one pieces of pixel data P00 to P20 in the vertical line VL1, the data-retention and difference-calculation unit $12_{01}$ calculates a difference using twenty-one pieces of pixel data P00 to P20 in the vertical line VL3, and the data-retention and difference-calculation unit $12_{02}$ calculates a difference using twenty-one pieces of pixel data P00 to P20 in the vertical line VL5.

Given this perspective, the vertical lines VL1, VL3 and VL5 of FIG. 16C are equivalent to a state where the lines L1, L3 and L5 of FIG. 2C in the horizontal direction are rotated 90 degrees clockwise. Here, while pixel data in three lines each extracted by jumping one line in the horizontal direction is used, pixel data in plural lines each extracted by jumping two or more lines or pixel data in plural sequential lines may be used. The number of lines used in the detecting is not limited to three, and plural lines adequately set may be used. As the number of lines used in the detecting is increased, false detection is reduced.

Hereinafter, it will be described using the number of pixels, the number of lines and the pixel width in the state of FIG. 16C after the extraction. As well as FIG. 3, each of the data-retention and difference-calculation units $12_{00}$ to $12_{02}$ includes nineteen difference data generating portions. As well as FIG. 3, the nineteen difference data generating portions carry out difference calculation using twenty-one pieces of pixel data P00 to P20. Namely, the difference data generating portions set pixel data P20 in the respective vertical lines VL1, VL3 and VL5 as reference pixel data, and generate nineteen pieces of difference data each of which represents the difference between two pieces of pixel data separated from each other by each of twenty to two pixels (that is, twenty to two lines) in the vertical direction of FIG. 16C. Difference data output from the data-retention and difference-calculation units $12_{00}$ to $12_{02}$ are denoted by $D20_{VL1}$ to $D02_{VL1}$, $D20_{VL3}$ to $D02_{VL3}$ and $D20_{VL5}$ to $D02_{VL5}$.

An adding unit 13 adds three pieces of difference data each between two pieces of pixel data separated from each other by each of twenty to two pixels in the vertical direction by each pixel interval "k". The pixel interval "k" represents a pixel interval in the vertical direction in the respective vertical lines VL1, VL3 and VL5. Nineteen pieces of added data $D20V_{sum}$ to $D02V_{sum}$ by respective pixel intervals "k" are input into a vertical direction accumulating unit 14. The vertical direction accumulating unit 14 has the same configuration as the horizontal direction accumulating unit 4 of FIG. 4. It is noted that a data retention portion in each accumulator of the vertical direction accumulating unit 14 retains input data by one pixel (that is, one line) in the vertical direction in FIG. 16C. The vertical direction accumulating unit 14 adds the respective nineteen pieces of added data $D20V_{sum}$ to $D02V_{sum}$ output from the adding unit 13 at the present time and respective nineteen pieces of added data $D20V_{sum}$ to $D02V_{sum}$ at past times by "k−1" pixels (that is, "k−1" lines), and then outputs nineteen pieces of vertical accumulated values AccV20 to AccV02 by respective pixel intervals "k".

As well as the case of the first configuration example, for the vertical accumulated values AccV20 to AccV02 by respective pixel intervals "k", a vertical accumulated value corresponding to a pixel width of a repetitive pattern in the vertical direction is the smallest.

Also, in the second configuration example, it is possible to detect whether or not a concerned pixel is located in a repetitive object in a vertical direction or detect a pixel width of a repetitive pattern which the repetitive object has, by using the nineteen pieces of vertical accumulated values AccV20 to AccV02 corresponding to intervals of twenty to two pixels. A small and large comparing unit 15 has the same configuration as that of FIG. 6, and decides how many pixels are included in a pixel width of a repetitive pattern which a repetitive object has, using the nineteen pieces of vertical accumulated values AccV20 to AccV02 corresponding to intervals of twenty to two pixels input from the vertical direction accumulating unit 14, and then outputs a decision value Fv. A vertical direction repetitive decision unit 16 has the same configuration as that of FIG. 8, and finally decides whether or not a decision value Fv represents a pixel width of a repetitive pattern and then outputs a detection signal Sdet.

The motion vector detecting apparatus and the motion vector detecting method of the second exemplary embodiment employ the repetitive object detecting device of the second configuration example described above as the repetitive object detecting unit 104 of FIG. 10 for example. An assembly of the correlation detecting unit 103, the repetitive object detecting unit 104 of the second configuration example and the motion vector detecting unit 105 and workings carried out by the assembly correspond to the motion vector detecting apparatus and the motion vector detecting method of the second exemplary embodiment.

Third Exemplary Embodiment

A motion vector detecting apparatus and a motion vector detecting method of the third exemplary embodiment employ the repetitive object detecting devices of both the first and second configuration examples as the repetitive object detecting unit 104 of FIG. 10 for example. An assembly of the correlation detecting unit 103, the repetitive object detecting unit 104 provided with both the first and second configuration examples and the motion vector detecting unit 105 and workings carried out by the assembly correspond to the motion vector detecting apparatus and the motion vector detecting method of the third exemplary embodiment. If the repetitive object detecting devices of both the first and second configuration examples are employed, it is possible to detect a motion vector with reference to detection signals Sdet of a repetitive object corresponding to both a horizontal direction and a vertical direction, which can drastically reduce false detection of the motion vector.

The present invention is not limited to the first to third exemplary embodiments described above, and various modifications are allowed without departing from the scope of the present invention.

What is claimed is:

1. A motion vector detecting apparatus comprising:
a correlation detecting unit configured to calculate difference values in a plurality of directions each between two pieces of pixel data in at least two frames and detect correlations each between two pieces of pixel data in the plurality of directions;
a repetitive object detecting unit configured to detect whether or not concerned pixel data in which a motion vector is to be detected is located in a repetitive object in which pixel data representing a certain gray level or color is repeated in a certain pattern in a horizontal or vertical direction;
a motion vector selecting unit configured to select a motion vector based on the difference values in the plurality of directions from the correlation detecting unit and output the selected motion vector; and
a motion vector compensating unit configured to, when the repetitive object detecting unit detects that the concerned pixel data is located in the repetitive object, render a motion vector, which has been detected in a past time with respect to a motion vector newly detected from the concerned pixel data, to be easy to be output as a motion vector.

2. The motion vector detecting apparatus according to claim 1, wherein the motion vector compensating unit comprises:
a correlation compensation gain generating portion configured to generate a gain for decreasing a difference value in a direction coincident with a direction of motion vector having detected at a past time among the difference values in the plurality of directions and decreasing a difference value in the direction coincident with the direction of motion vector at a time when the repetitive object detecting unit detects that the concerned pixel data is located in the repetitive object so as to be smaller than a difference value in the direction coincident with the direction of motion vector at a time when the repetitive object detecting unit does not detect that the concerned pixel data is located in the repetitive object; and
a correlation compensating portion configured to respectively multiply the difference values in the plurality of directions from the correlation detecting unit by gains generated by the correlation compensation gain generating portion,
wherein the motion vector selecting unit selects as a motion vector a direction having the smallest difference value among the compensated difference values in the plurality of directions from the correlation compensating portion, and outputs the selected motion vector.

3. The motion vector detecting apparatus according to claim 2, wherein the correlation compensation gain generating portion comprises:
comparators each of which individually retains each of motion vectors in the plurality of directions, and compares the motion vector having been detected at past time with the retained motion vector;
accumulators each of which accumulates a comparison result from each of the comparators; and
compensators each of which increases an accumulated value from each of the accumulators and outputs an inverse of the increases accumulated value as a gain when the repetitive object detecting unit detects that the concerned pixel data is located in the repetitive object, and outputs an inverse of an accumulated value from each of the accumulators as a gain when the repetitive object detecting unit does not detect that the concerned pixel data is located in the repetitive object.

4. The motion vector detecting apparatus according to claim 1, wherein the repetitive object detecting unit comprises:
a difference calculation portion configured to carry out, with respect to lines of a video signal, a process for setting as reference pixel data pixel data located at an end of pieces of pixel data within a certain range of pixel data alignment in one line of the video signal, and calculating a difference between the reference pixel data and each piece of pixel data within a range from pixel data separated from the reference pixel data by two pixels to pixel data separated from the reference pixel data by the maximum number of pixels in the pieces of pixel data so as to obtain difference data by each of separated pixel numbers;
an adding portion configured to add pieces of difference data obtained with respect to the lines of the video signal by the difference calculation portion by each of the separated pixel numbers so as to obtain added data by each of the separated pixel numbers;
a horizontal direction accumulating portion configured to sequentially delay the added data obtained by each of the separated pixel numbers for a time corresponding to one pixel within a range from a time corresponding to one pixel to a time corresponding to a pixel number generated by subtracting one from each of the separated pixel numbers, and accumulate added data before the delaying and all delayed pieces of added data so as to obtain a horizontal accumulated value by each of the separated pixel numbers in which added data obtained by each of the separated pixel numbers is accumulated in a horizontal direction; and
a small and large comparing portion configured to carry out a small and large comparison with respect to the horizontal accumulated value obtained by each of the separated pixel numbers by the horizontal direction accumulating portion so as to decide whether or not the reference pixel data is located in a repetitive object including a certain repetitive pattern.

5. A motion vector detecting method comprising:
generating difference values in a plurality of directions each between two pieces of pixel data in at least two frames;
detecting whether or not concerned pixel data in which a motion vector is to be detected is located in a repetitive object in which pixel data representing a certain gray level or color is repeated in a certain pattern in a horizontal or vertical direction;
selecting a motion vector based on the difference values in the plurality of directions generated in the generating; and
replacing a motion vector which is newly detected from the concerned pixel data with a motion vector which has been detected in a past time, when the detecting detects that the concerned pixel data is located in the repetitive object, and outputting the replaced motion vector.

6. A motion vector detecting method comprising:
generating difference values in a plurality of directions each between two pieces of pixel data in at least two frames;
detecting whether or not concerned pixel data in which a motion vector is to be detected is located in a repetitive object in which pixel data representing a certain gray level or color is repeated in a certain pattern in a horizontal or vertical direction;
generating a gain for decreasing a difference value in a direction coincident with a direction of motion vector having detected at a past time among the difference values in the plurality of directions, and decreasing a difference value in the direction coincident with the direction of motion vector at a time when the repetitive object detecting unit detects that the concerned pixel data is located in the repetitive object so as to be smaller than a difference value in the direction coincident with the direction of motion vector at a time when the repetitive object detecting unit does not detect that the concerned pixel data is located in the repetitive object;
multiplying the difference values in the plurality of directions generated in the generating by gains generated in the generating to compensate the difference values in the plurality of directions; and
selecting as a motion vector a direction having the smallest difference value among the compensated difference values in the plurality of directions.

7. The motion vector detecting method according to claim 5, wherein the detecting comprises:
extracting pieces of pixel data within a certain range of pixel data alignment in one line of a video signal with respect to lines of the video signal;
setting as reference pixel data pixel data located at an end of the pieces of pixel data with respect to the lines of the video signal, and calculating a difference between the reference pixel data and each piece of pixel data within a range from pixel data separated from the reference pixel data by two pixels to pixel data separated from the reference pixel data by the maximum number of pixels in the pieces of pixel data so as to obtain difference data by each of separated pixel numbers;
adding pieces of difference data obtained with respect to the lines of the video signal by each of the separated pixel numbers so as to obtain added data by each of the separated pixel numbers;
sequentially delaying the added data obtained by each of the separated pixel numbers for a time corresponding to one pixel within a range from a time corresponding to one pixel to a time corresponding to a pixel number generated by subtracting one from each of the separated pixel numbers, and accumulating added data before the delaying and all delayed pieces of added data so as to obtain a horizontal accumulated value by each of the separated pixel numbers in which added data obtained by each of the separated pixel numbers is accumulated in a horizontal direction; and
carrying out a small and large comparison with respect to the horizontal accumulated value obtained by each of the separated pixel numbers so as to decide whether or not the reference pixel data is located in a repetitive object including a certain repetitive pattern.

8. The motion vector detecting method according to claim 6, wherein the detecting comprises:
extracting pieces of pixel data within a certain range of pixel data alignment in one line of a video signal with respect to lines of the video signal;
setting as reference pixel data pixel data located at an end of the pieces of pixel data with respect to the lines of the video signal, and calculating a difference between the reference pixel data and each piece of pixel data within a range from pixel data separated from the reference pixel data by two pixels to pixel data separated from the reference pixel data by the maximum number of pixels in the pieces of pixel data so as to obtain difference data by each of separated pixel numbers;
adding pieces of difference data obtained with respect to the lines of the video signal by each of the separated pixel numbers so as to obtain added data by each of the separated pixel numbers;
sequentially delaying the added data obtained by each of the separated pixel numbers for a time corresponding to one pixel within a range from a time corresponding to one pixel to a time corresponding to a pixel number generated by subtracting one from each of the separated pixel numbers, and accumulating added data before the delaying and all delayed pieces of added data so as to obtain a horizontal accumulated value by each of the separated pixel numbers in which added data obtained by each of the separated pixel numbers is accumulated in a horizontal direction; and
carrying out a small and large comparison with respect to the horizontal accumulated value obtained by each of the separated pixel numbers so as to decide whether or not the reference pixel data is located in a repetitive object including a certain repetitive pattern.

* * * * *